(12) United States Patent
Bauerschmidt et al.

(10) Patent No.: US 11,694,265 B2
(45) Date of Patent: *Jul. 4, 2023

(54) SYSTEM AND METHOD FOR CENTRALIZED CLEARING OF OVER THE COUNTER FOREIGN EXCHANGE INSTRUMENTS

(71) Applicant: Chicago Mercantile Exchange Inc., Chicago, IL (US)

(72) Inventors: Paul Andrew Bauerschmidt, Chicago, IL (US); Dmitriy Glinberg, Northbrook, IL (US); Edward M. Gogol, Skokie, IL (US); Stephen M. Goldman, Lake Forest, IL (US); Paul I. Lichter, Batavia, IL (US); Jeffrey Robert Mitchell, Porter, IN (US); Ari L. Studnitzer, Northbrook, IL (US); Tae Seok C. Yoo, Bartlett, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/973,619

(22) Filed: Oct. 26, 2022

(65) Prior Publication Data
US 2023/0059070 A1 Feb. 23, 2023

Related U.S. Application Data

(63) Continuation of application No. 17/582,183, filed on Jan. 24, 2022, now Pat. No. 11,538,009, which is a
(Continued)

(51) Int. Cl.
*G06Q 40/04* (2012.01)
*G06Q 40/00* (2023.01)

(52) U.S. Cl.
CPC .............. *G06Q 40/04* (2013.01); *G06Q 40/00* (2013.01)

(58) Field of Classification Search
None
See application file for complete search history.

(56) References Cited

U.S. PATENT DOCUMENTS 4,903,201 A * 2/1990 Wagner ................ G06Q 40/04
705/37
4,980,826 A 12/1990 Wagner
(Continued)

FOREIGN PATENT DOCUMENTS

GB 2417345 A 2/2006
JP 7-506916 7/1995
(Continued)

OTHER PUBLICATIONS

Canadian Examination Report in Canadian Application No. 2,628,944, dated Nov. 24, 2015.
(Continued)

*Primary Examiner* — Jason M. Borlinghaus
(74) *Attorney, Agent, or Firm* — Lempia Summerfield Katz LLC

(57) ABSTRACT

The disclosed systems and methods relate to allowing trading of over the counter ("OTC") foreign exchange ("FX") contracts on a centralized matching and clearing mechanism, such as that of the Chicago Mercantile Exchange's ("CME"'s) futures exchange system (the "Exchange"). The disclosed systems and methods allow for anonymous transactions, centralized clearing, efficient settlement and the provision of risk management/credit screening mechanisms to lower risk, reduce transaction costs and improve the liquidity in the FX market place. In particular, the disclosed embodiments increase speed of execution facilitating growing demand for algorithmic trading, increased price trans- (Continued)

parency, lower cost of trading, customer to customer trading, and automated asset allocations, recurring trades as well as clearing and settlement efficiencies.

26 Claims, 14 Drawing Sheets

Related U.S. Application Data continuation of application No. 16/907,958, filed on Jun. 22, 2020, now Pat. No. 11,270,379, which is a continuation of application No. 11/590,540, filed on Oct. 31, 2006, now Pat. No. 10,726,479.

(60) Provisional application No. 60/738,246, filed on Nov. 18, 2005.

(56) References Cited

U.S. PATENT DOCUMENTS

| | | | |
|---|---|---|---|
| 5,963,923 A | 10/1999 | Garber |
| 6,021,397 A | 2/2000 | Jones |
| 6,317,727 B1 | 11/2001 | May |
| 6,321,212 B1 | 11/2001 | Lange |
| 6,347,307 B1 | 2/2002 | Sandhu et al. |
| 6,405,180 B2 | 6/2002 | Tilfors |
| 6,421,653 B1 | 7/2002 | May |
| 6,618,707 B1 | 9/2003 | Gary |
| 6,658,393 B1 | 12/2003 | Basch |
| 6,721,715 B2 | 4/2004 | Nemzow |
| 6,963,856 B2 | 11/2005 | Lutnick |
| 6,996,540 B1 | 2/2006 | May |
| 7,039,610 B2 | 5/2006 | Morano et al. |
| 7,043,457 B1 | 5/2006 | Hansen |
| 7,080,050 B1 | 7/2006 | Himmelstein |
| 7,089,206 B2 | 8/2006 | Martin |
| 7,130,789 B2 | 10/2006 | Glodjo |
| 7,177,833 B1 | 2/2007 | Marynowski |
| 7,194,481 B1 | 3/2007 | Van Roon |
| 7,734,538 B2 | 6/2010 | Bauerschmidt |
| 7,801,810 B2 | 9/2010 | Glinberg et al. |
| 7,809,631 B2 | 10/2010 | Bauerschmidt et al. |
| 7,930,245 B2 | 4/2011 | Glinberg |
| 8,086,527 B2 | 12/2011 | Bauerschmidt |
| 2001/0014875 A1 | 8/2001 | Young |
| 2001/0042785 A1 | 11/2001 | Walker |
| 2001/0056398 A1 | 12/2001 | Scheirer |
| 2002/0002530 A1 | 1/2002 | May |
| 2002/0035531 A1 | 3/2002 | Push |
| 2002/0046152 A1 | 4/2002 | Kinney |
| 2002/0052827 A1 | 5/2002 | Waelbroeck |
| 2002/0070915 A1 | 6/2002 | Mazza |
| 2002/0077947 A1 | 6/2002 | Ward |
| 2002/0099651 A1 | 7/2002 | May |
| 2002/0116314 A1 | 8/2002 | Spencer |
| 2002/0116317 A1 | 8/2002 | May |
| 2002/0156719 A1 | 10/2002 | Finebaum |
| 2002/0169774 A1 | 11/2002 | Greenbaum |
| 2002/0178102 A1 | 11/2002 | Scheinberg |
| 2002/0184134 A1 | 12/2002 | Olsen |
| 2003/0009419 A1 | 1/2003 | Chavez |
| 2003/0023531 A1 | 1/2003 | Fergusson |
| 2003/0023542 A1 | 1/2003 | Kemp |
| 2003/0033240 A1 | 2/2003 | Balson et al. |
| 2003/0050879 A1 | 3/2003 | Rosen |
| 2003/0093360 A1 | 5/2003 | May |
| 2003/0125982 A1 | 7/2003 | Ginsberg |
| 2003/0200167 A1 | 10/2003 | Kemp |
| 2003/0220868 A1 | 11/2003 | May |
| 2003/0229571 A1 | 12/2003 | May |
| 2003/0236737 A1 | 12/2003 | Kemp |
| 2004/0015430 A1 | 1/2004 | May |
| 2004/0015431 A1 | 1/2004 | May |
| 2004/0024692 A1 | 2/2004 | Turbeville |
| 2004/0049738 A1 | 3/2004 | Thompson |
| 2004/0064395 A1 | 4/2004 | Mintz |
| 2004/0093300 A1 | 5/2004 | Burns |
| 2004/0103054 A1 | 5/2004 | Singer |
| 2004/0117302 A1 | 6/2004 | Weichert |
| 2004/0148242 A1 | 7/2004 | Liu |
| 2004/0153391 A1 | 8/2004 | Burns |
| 2004/0153392 A1 | 8/2004 | West |
| 2004/0153393 A1 | 8/2004 | West |
| 2004/0153394 A1 | 8/2004 | West |
| 2004/0172337 A1 | 9/2004 | Spoonhower |
| 2004/0186806 A1 | 9/2004 | Sinclair |
| 2004/0210514 A1 | 10/2004 | Kemp |
| 2004/0236662 A1 | 11/2004 | Korhammer et al. |
| 2004/0254804 A1 | 12/2004 | Peterffy |
| 2004/0260640 A1 | 12/2004 | Crosthwaite |
| 2005/0021454 A1 | 1/2005 | Karpovich |
| 2005/0044027 A1 | 2/2005 | Rodgers |
| 2005/0080703 A1 | 4/2005 | Chiesa |
| 2005/0086152 A1 | 4/2005 | Sweeting |
| 2005/0097027 A1 | 5/2005 | Kavanaugh |
| 2005/0137964 A1 | 6/2005 | Nordlicht |
| 2005/0171890 A1 | 8/2005 | Daley |
| 2005/0171894 A1 | 8/2005 | Traynor |
| 2005/0246263 A1 | 11/2005 | Ogg |
| 2005/0283422 A1 | 12/2005 | Myr |
| 2006/0059064 A1 | 3/2006 | Glinberg |
| 2006/0059065 A1 | 3/2006 | Glinberg |
| 2006/0059066 A1 | 3/2006 | Glinberg |
| 2006/0059067 A1 | 3/2006 | Glinberg |
| 2006/0059068 A1 | 3/2006 | Glinberg |
| 2006/0059069 A1 | 3/2006 | Glinberg |
| 2006/0095363 A1 | 5/2006 | May |
| 2006/0173761 A1 | 8/2006 | Costakis |
| 2006/0173771 A1 | 8/2006 | Johnston |
| 2006/0190371 A1 | 8/2006 | Almgren |
| 2006/0190383 A1 | 8/2006 | May |
| 2006/0218071 A1 | 9/2006 | Sweeting |
| 2006/0224494 A1 | 10/2006 | Pinkava |
| 2006/0265296 A1 | 11/2006 | Glinberg |
| 2007/0011079 A1 | 1/2007 | May |
| 2007/0239591 A1 | 10/2007 | May |
| 2007/0282733 A1 | 12/2007 | May |
| 2008/0077320 A1 | 3/2008 | Loftus |
| 2010/0312720 A1 | 12/2010 | Glinberg |

FOREIGN PATENT DOCUMENTS

| | | |
|---|---|---|
| JP | 11-507150 | 6/1999 |
| JP | 2002207881 A | 7/2002 |
| JP | 2003050912 A | 2/2003 |
| JP | 2003-536170 | 12/2003 |
| JP | 2004021906 A | 1/2004 |
| JP | 2004234197 A | 8/2004 |
| WO | 9315467 | 8/1993 |
| WO | 9641293 A1 | 12/1996 |
| WO | 0111518 A8 | 11/2001 |
| WO | 0198968 A8 | 12/2001 |
| WO | 2004042514 A3 | 5/2004 |
| WO | 2005041079 A2 | 5/2005 |

OTHER PUBLICATIONS

CME "Clearing Services Layout for Results", advisory notice, obtained from http://www/web.archive org/web/20050308181020/http://www.cme.com/clearing/rms, available as early as Apr. 7, 2009.

CME "Glossary for Retail FX", http://www.cme.com/files/FXWebglossary.pdf; 16 pages, accessed Apr. 7, 2009.

CME EOS Trader™ Enhancements: Credit Controls, Chicago Mercantile Exchange, Inc., Mar. 25, 2007, 3 pages.

CME® Clearing Services "CME and LCH", advisory notice, obtained from http://www.web.archive.org/web/20050306002321/http://www.cme.com/clearing/rmspan/cm/lch . . . last accessed Feb. 22, 2007, 1 page.

(56) References Cited

OTHER PUBLICATIONS

CME® Foreign Exchange Products "Trading CME FX Futures: Maximizing the Opportunity for the Individual Investor", 6 pages © 2005.
Decision of Refusal from corresponding Japanese Patent Application No. 2008-541147, 2 pages., dated Oct. 30, 2013.
Examiner's Report from corresponding Canadian Patent Application No. CA 2,626,935, 5 pages, dated Jul. 3, 2013.
Examiner's Report from corresponding Canadian Patent Application No. CA 2,628,879, 4pp., dated Jan. 3, 2014.
Globex® Interface Development and Testing Agreement, Chicago Mercantile Exchange, Inc., 12 pages, Feb. 7, 2008.
Hall "Getting Started in Stocks", Third Edition; Google Book Search; http://books.google.com/books?id=mA-sSkmBsC&dg=margin+account+maintenance . . . , Sep. 26, 2008; pp. 105-114; Coughlan Publishing; 1997.
Hiroshi Yonemura, Theory of Monetary Economics and Securities for Investment Engineering, Mar. 29, 2001, Toyo Keizai Inc., pp. 53-55.
http://wvvw.rulebook.cme.com/Rulebook/utilityes/allPositionlimits. html, CME Rulebook—Position Limits and Accountability for All Products, Chicago Mercantile Exchange, Inc., 40 pages, available as early as Apr. 7, 2009.
http://www.cbot.com/cbot/pub/con_detail/0,3206,1032+42998,00. html, Position Limits in Treasury Futures for Dec. 2006 Contracts, Chicago Board of Trade, 1 page, available as early as Apr. 7, 2009.
http://www.cftc.gov/index.htm, U.S. Commodity Futures Trading Commission, "What's New at the CFTC", Mar. 18, 2009, 2 pages.
http://www.cftc.gov/industryoversight/clearingorganizations.index. htm, Clearing Organizations, Jun. 17, 2008, 2 pages.
http://www.cftc.gov/industryoversight/contractsandproducts/sfpspeculativelimits.html, Security Futures Products Speculative Position Limits, Jul. 26, 2007, U.S. Commodity Futures TradingCommission, 1 page.
http://www.cftc.gov/industryoversight/tradingorganizations/index. htm3, "Trading Organizations",Nov. 9, 2007, 1 page.
http://www.cme.com/files/005.pdf, CME Rulebook, Chapter 5—Trading Qualifications and Practices, Chicago Mercantile Exchange, 63 pages, available as early as Apr. 7, 2009.
http://www.cme.com/trading /res/reg/position.html, Position Limits/Accountability & Reportable Levels, Chicago Mercantile Exchange, Inc., 1 page, available as early as Apr. 7, 2009.
http://www.investopedia.com/terms/p/positionlimit.asp, Position Limit, Mar. 19, 2009, 4 pages.
http://www.rulebook.cme.com/Rulebook/utilities/positionLimitIndex. html, CME Rulebook—Position Limit and Position Accountability Definitions, Rules, and Levels, Chicago Mercantile Exchange, Inc., 5 pages, available as early as Apr. 7, 2009.
International Search Report, PCT/IB04/52236, dated Mar. 23, 2006.
International Search Report, PCT/US06/28001, dated May 7, 2007.
International Search Report, PCT/US06/43282, dated May 30, 2008.
International Search Report, PCT/US06/44932, dated Aug. 19, 2008.
International Search Report, PCT/US08/71452, dated Oct. 7, 2008.
International Search Report, PCT/US2006/027762, dated Mar. 9, 2007.
International Search Report, PCT/US2006/044702, dated Aug. 17, 2007.
International Search Report, PCT/US2006/044917, dated Aug. 28, 2007.
Japanese Office Action, cited in corresponding Japanese patent application No. 2008-541219, 5 pages, dated Jan. 30, 2013.
Jennifer Basye Sander et al., "The Complete Idiot's Guide to Day Trading Like a Pro", Alpha Books, 1999, pp. 65-67.
Kuprianov, "Money Market Futues", Federal Reserve Bank of Richmond, Economic Review, Nov./Dec. 1992, 19 pages.
Makoto Saito, Concept and Usage of Financial Technologies, Jul. 20, 2000, Yuhikaku Publishing Co., Ltd., pp. 60-62.
Mina Mehta, "Fast and Furious: Risk Management in a OMA Environment", Jul./Aug. 2006 Futures Industry, 3 pages.
Nobuyuki Kitamura et al., "The Current Situations and Issues of Electronic Commerce: Birth of New Type Brokers and Their Trust Formation", Discussion Papers Series 2000 J-13, Institue for Money and Economic Studies, Bank of Japan, p. 26, available as early as Jul. 18, 2012.
Notice—Revised Position Limits in Treasury Futures During Last Ten Trading Days, Jul. 19, 2006, Paul J. Draths—Vice President & Secretary, Chicago Board of Trade, 3 pages.
Office Action dated Feb. 2, 2012 for Canadian Application No. 2,626,935, 4 pages.
Office Action dated Mar. 21, 2012 for Japanese Application No. 2008-541147, 9 pages.
Office Action dated May 23, 2012 for Canadian Application No. 2,628,879, 3 pages.
Office Action dated May 8, 2012 for corresponding Japanese Application No. 2008-541219, 5 pages.
Office Action dated May 8, 2012 for corresponding Japanese Application No. 2008-541410, 5 pages.
Official Communication from EP Application No. 06838090.6, dated Feb. 8, 2016.
Position Limit and Reportable Level Table, 3 pages, Chicago Board of Trade, available as early as Apr. 7, 2009.
Position Limit, http://www.investopedia.com/terms/positionlimit. asp, 1 page, available as early as Apr. 7, 2009.
Position Limits and Position Accountability, ICE Futures U.S., Feb. 15, 2008, www.theice.com, 5 pages.
Sam Y. Cross, "All About . . . the Foreign Exchange Market in the United States", Federal Bank of New York, 1998, pp. 42-60 and 121-132 of Japanese translation, pp. 21-30 and 59-66 of original version.
Sam Y. Cross, "All About . . . the Foreign Exchange Market in the United States", Federal Bank of New York, 1998, pp. 62-74 of Japanese translation, pp. 31-36 of original version.
Second Japanese Office Action, cited in corresponding Japanese patent application No. 2008-541219, 5 pages, Jan. 30, 2013.
Special Executive Report, Increase in Position Limits on CME Russell 2000® and e-Mini® Russell 2000 Contracts, w pages, Apr. 20, 2006, Chicago Mercantile Exchange, Inc.
Takashi Nishizawa, Introduction to FX Net-Trading, Mar. 30, 2005, Nihonbungeisha, p. 12.

* cited by examiner

FIG. 3

Example – FX OTC Inter-bank style

| USD/CHF | SHOWN | | HIDDEN / IMPLIED PRICES | | | |
|---|---|---|---|---|---|---|
| | Bid | Offer | SWAP Leg Prices | | Outright Forward Prices | |
| Spot | 1.2882 | 1.2885 | 1.2884 | | | |
| Fwd pt multiplier | 0.0001 | | Calculated | | | |
| | | | Bid | Offer | Bid | Offer |
| | Forward points | | | | | |
| T/N | -1.12 | -1.10 | 1.288238 | 1.288240 | 1.288088 | 1.288390 |
| SN | -1.13 | -1.08 | 1.288237 | 1.288242 | 1.288087 | 1.288392 |
| 1W | -8.25 | -8.05 | 1.287525 | 1.287545 | 1.287375 | 1.287695 |
| 1M | -37.90 | -37.40 | 1.284560 | 1.284610 | 1.284410 | 1.284760 |
| 2M | -73.20 | -71.00 | 1.281030 | 1.281190 | 1.280880 | 1.281340 |
| 3M | -111.40 | -108.90 | 1.277210 | 1.277460 | 1.277060 | 1.277610 |
| 4M | -149.40 | -146.90 | 1.273410 | 1.273660 | 1.273260 | 1.273810 |
| 5M | -182.90 | -179.90 | 1.270060 | 1.270360 | 1.269910 | 1.270510 |
| 6M | -219.30 | -216.00 | 1.266420 | 1.266550 | 1.266270 | 1.266700 |
| 9M | -324.75 | -322.75 | 1.255875 | 1.256075 | 1.255725 | 1.256225 |
| 1Y | -426.50 | -422.50 | 1.245700 | 1.246100 | 1.245550 | 1.246250 |
| 2Y | -833.00 | -745.00 | 1.205050 | 1.213850 | 1.204900 | 1.214000 |

Spot leg of a swap is done at "mid-point" of the spot bid/offer. In this example, the spot leg is priced at 1.2884.

Forward leg of a swap is anchored off the mid-point of outright spot bid/ask, i.e. 1.2884 in this example. Further, the forward points are expressed in multiples of the "finest tick" in the spot price, i.e. 0.0001 in this example.
Thus, the forward leg of the 2yr Swap (on the bid side) is 1.2884 + .0001 x (-833.00) = 1.205050
The offer side of the same swap is
1.2884 + .0001 x (-745.00) = 1.213850

Precision of the forward leg (both in swaps and outright forwards) is two additional significant figures vs. the spot quotes.

Outright forward bids are anchored off the Spot bid. Same multiplier applies
e.g. 2yr Outright Bid =
1.2882 + .0001 x (-833.00) =
1.204900.

Similarly, outright forward offers are anchored off the Spot offer.
e.g. 2yr Outright Offer =
1.2885 + .0001 x (-745.00) =
1.214000.

FIG. 4

Directed RFQ – Business Message Flow

| Source/Dest | Direction | Message Type | Information in the Message | Globex Component Activity |
|---|---|---|---|---|
| *Normal Flow* | | | | |
| Trader | → | RFQ | Size/AON qualifier | Normal RFQ process |
| Trader | ← | RFQ ACK/NACK | Unique RFQ ID | |
| MDP | ← | M4 | Unique RFQ ID | |
| MarketMaker | → | ActionableRFQResponse | RFQ ID, one or two sides, Time To Live (TTL) | Validate exact size match with RFQ, store MM info under this new ID |
| MarketMaker | ← | ActRFQRes ACK/NACK | Unique ActionableRFQResp ID | |
| Trader | ← | ActionableRFQResponse | Anonymized, ActionableRFQResp ID | Trader gets all responses, no filtering is done by Globex component |
| Trader | → | Block/Hit one of them | ActionableRFQResp ID as only counterparty info | Validate TTL on the ActionableRFQResp, validate that only a single Block may be used for any given original RFQ |
| Trader | ← | Block ACK/NACK | | |
| Trader & MM | ← | ExecutionReports | | Book the trade normally |
| MDP | ← | Normal M6, M0, etc | | |
| *MM Cancellation Flow* | | | | |
| MarketMaker | → | ActionableRFQResponseCancel | Unique ActionableRFQResp ID | |
| MarketMaker | ← | ActionableRFQResponseCancel ACK/NACK | | |
| Trader | ← | ActionableRFQResponseCancel | Unique ActionableRFQResp ID | |

FIG. 5B

Cross-Margin Offset

Positions from Opposite Counter-parties

"Side A" Buy vs "Side B" Short

Counter-party Or Exchange B Short (SELL)

Counter-party Or Exchange A Long (BUY)

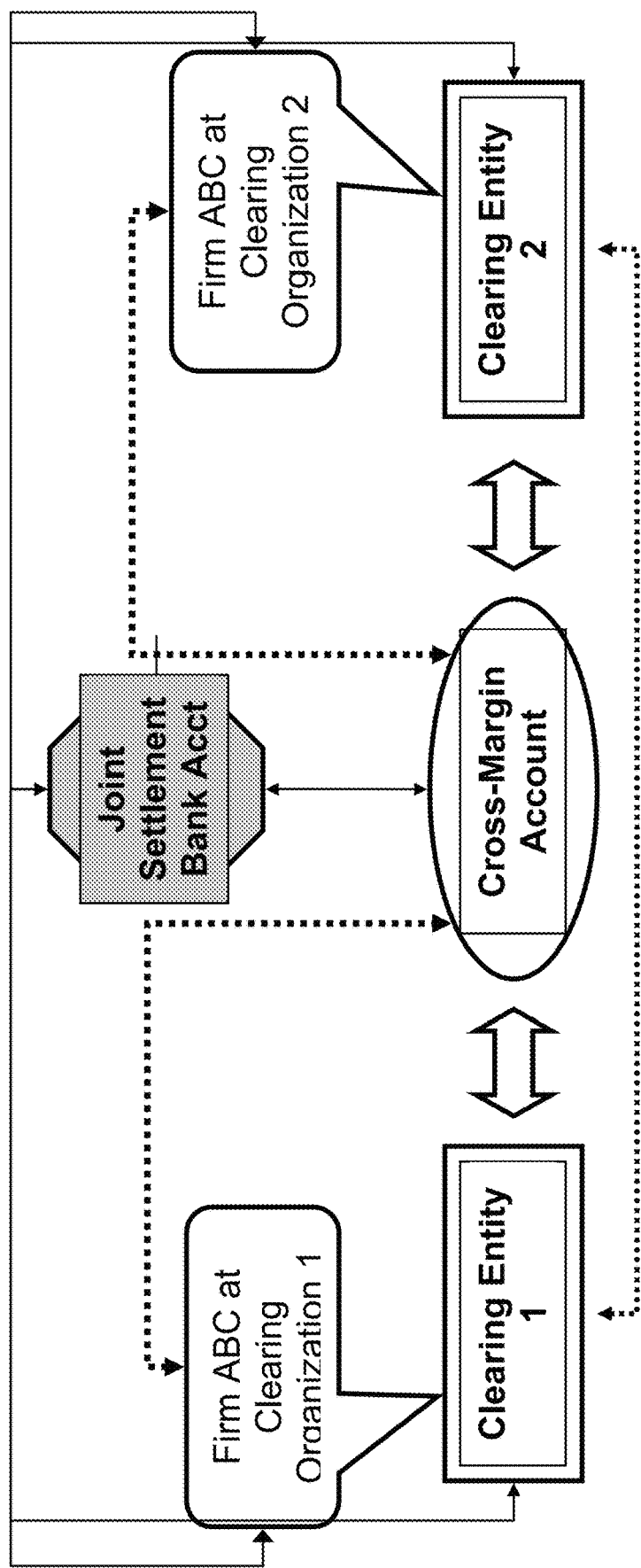

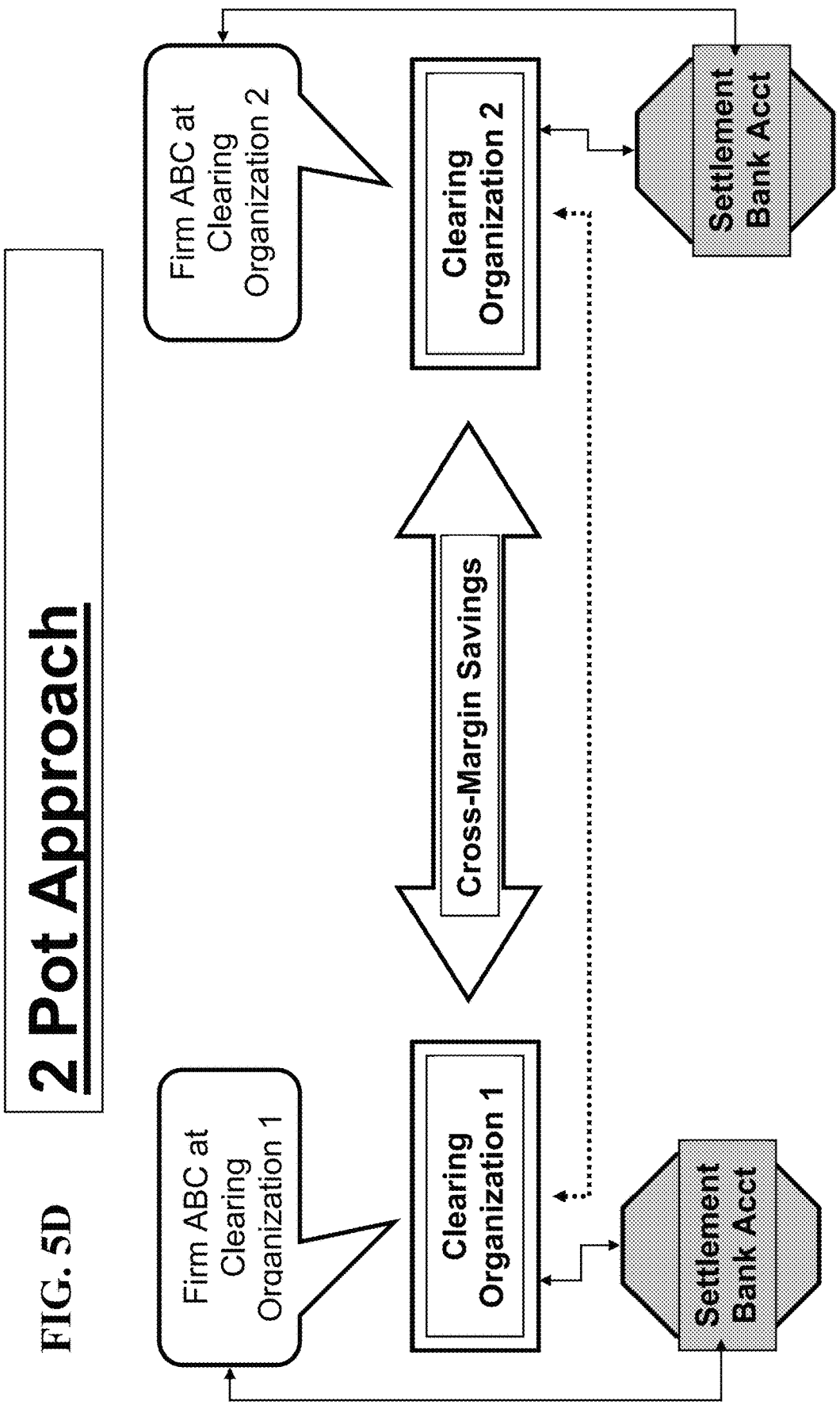

Cross-margining utilizes X-Margin margin that was Not Offset

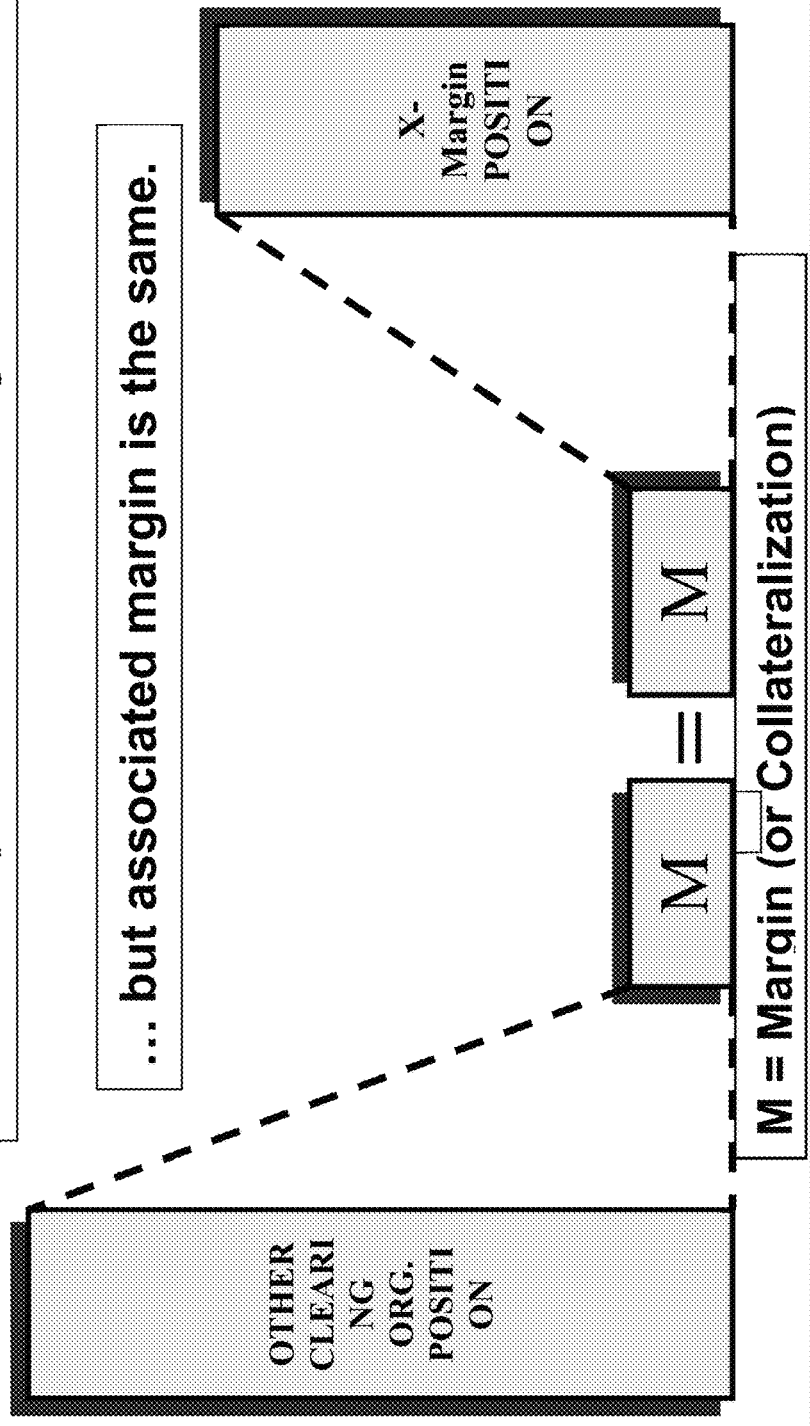

SYSTEM AND METHOD FOR CENTRALIZED CLEARING OF OVER THE COUNTER FOREIGN EXCHANGE INSTRUMENTS

REFERENCE TO RELATED APPLICATIONS

This application is a continuation under 37 C.F.R. § 1.53(b) of U.S. patent application Ser. No. 17/582,183 filed Jan. 24, 2022 now U.S. Pat. No. 11,538,109, which is a continuation under 37 C.F.R. § 1.53(b) of U.S. patent application Ser. No. 16/907,958 filed Jun. 22, 2020 now U.S. Pat. No. 11,270,379, which is a continuation under 37 C.F.R. § 1.53(b) of U.S. patent application Ser. No. 11/590,540 filed Oct. 31, 2006 now U.S. Pat. No. 10,726,479, which claims the benefit of the filing date under 35 U.S.C. § 119(e) of U.S. Provisional Application Ser. No. 60/738,246 filed Nov. 18, 2005, which are all hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Futures Exchanges, referred to herein also as an "Exchange", such as the Chicago Mercantile Exchange Inc. (CME), provide a marketplace where futures and options on futures are traded. Futures is a term used to designate all contracts covering the purchase and sale of financial instruments or physical commodities for future delivery on a commodity futures exchange. A futures contract is a legally binding agreement to buy or sell a commodity at a specified price at a predetermined future time. Each futures contract is standardized and specifies commodity, quality, quantity, delivery date and settlement. An option is the right, but not the obligation, to sell or buy the underlying instrument (in this case, a futures contract) at a specified price within a specified time.

The foreign exchange market is the largest and most liquid financial market in the world, representing more than $1.2 trillion worth of transactions each day. Also known as forex or FX, currency trading typically involves the simultaneous purchase of one currency while selling another currency. Currencies are typically traded in pairs, such as U.S. dollar/Japanese yen (USD/JPY) or Euro/U.S. dollar (EUR/USD), or via currency indexes, such as the CME$INDEX™.

In order to capitalize on the foreign exchange market, CME also offers FX futures products, i.e. futures contracts where the underlying financial instrument is a foreign currency transaction, in addition to futures products based on other commodities and financial instruments. However, FX futures are not the only mechanisms by which foreign currencies may be traded. For example, the FX interbank market is a global network of the world's banks with no centralized location for trading. Much of the business is conducted over the-phone or electronically bank-to-bank. The FX market is a 24-hour-per-day market during the FX business week. The day starts in Asia, extends over to Europe and then into the U.S. daytime trading hours. Currencies are traded around the world, around the clock, from Monday morning (Sunday afternoon Chicago/New York time) in New Zealand/Asia to the close of the business week on Friday afternoon in Chicago/New York.

Over the Counter ("OTC") is the term often used to refer to currency trading instruments which are not classified as a "futures" instrument as defined above and not traded on a futures exchange such as CME, i.e. that which is not a futures contract is an OTC contract. Such OTC contracts include "forward" contracts, i.e. private agreements between buyers and sellers, i.e. bilateral contracts, for the future delivery of a commodity at an agreed price. While futures contracts are regulated by the Commodity Futures Trading Commission ("CFTC"), forward or OTC contracts are not so regulated, making them more flexible and an attractive device to certain investors and certain markets.

Speculators are active in the FX markets, as they are attracted to the opportunities that volatile and changing market conditions create. A multitude of economic forces impact the world's currencies. Some of the forces at work include interest rate differentials, domestic money supply growth, comparative rates of inflation, central bank intervention and political stability. In times of global uncertainty, some currencies may benefit from perceived "flight-to-safety" status. Or, if one country's economic outlook is perceived as strong by market forces, its currency may be firmer than another country's currency, where economic or political conditions are viewed with caution.

FX traders include governments, corporations and fund managers doing business with foreign countries, that need to exchange one currency for another, and speculators who seek to profit from price movements in the markets.

The highly liquid and volatile currency markets offer opportunities for speculators every day. Most speculators tend to focus on the so-called "majors," which are the most actively traded currencies and include the U.S. dollar, the euro, the Japanese yen, the British pound, the Swiss franc, the Australian dollar and the Canadian dollar.

While the OTC FX market offers advantages such as less regulation and more product flexibility, CME's futures exchange offers its own benefits, such as centralized and anonymous matching and clearing, as well as efficiency optimization and risk management/credit screening mechanisms not available in the present OTC markets. It would therefore be advantageous to be able to trade OTC FX products via the same mechanisms used to trade futures contracts in order to secure these same benefits and protections.

Accordingly, there is a need for systems and methods to allow OTC FX products to be traded in a centralized matching and clearing environment such as the environment utilized by CME's futures exchange.

BRIEF DESCRIPTION OF THE DRAWINGS

FIG. 3 shows an exemplary screen display and price determination.

FIG. 4 shows an exemplary business message flow for the Directed RFQ functionality for use with the disclosed embodiments.

FIGS. 5A-5G depict block diagrams of a Flexible Hybrid Central Counter-party Cross-Margining or Cross Collateralization system according to one embodiment.

DETAILED DESCRIPTION OF THE DRAWINGS AND PRESENTLY PREFERRED EMBODIMENTS

The disclosed systems and methods relate to allowing trading of over the counter ("OTC") foreign exchange ("FX") contracts on a centralized matching and clearing mechanism, such as that of the Chicago Mercantile Exchange's ("CME"'s) futures exchange system (the "Exchange"). The disclosed systems and methods allow for anonymous transactions, centralized clearing, efficient settlement and the provision of risk management/credit screening mechanisms to lower risk, reduce transaction costs and improve the liquidity in the FX market place. In particular, the disclosed embodiments increase speed of execution facilitating growing demand for algorithmic trading, increased price transparency, lower cost of trading, customer to customer trading, and automated asset allocations, recurring trades as well as clearing and settlement efficiencies.

Figure 1:
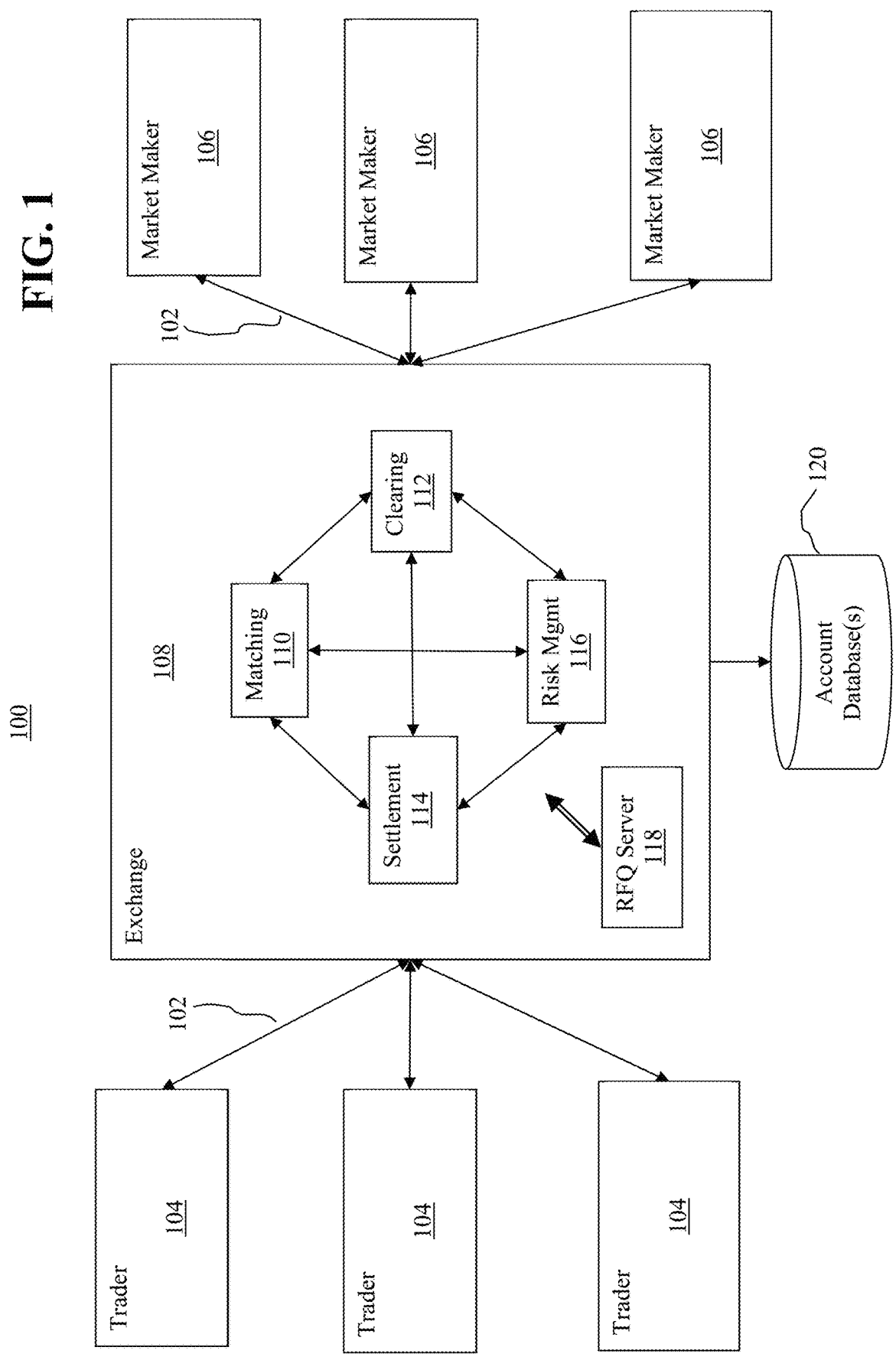
FIG. 1 depicts a block diagram of an exemplary system for trading OTC FX instruments according to the disclosed embodiments.
Figure 2A:
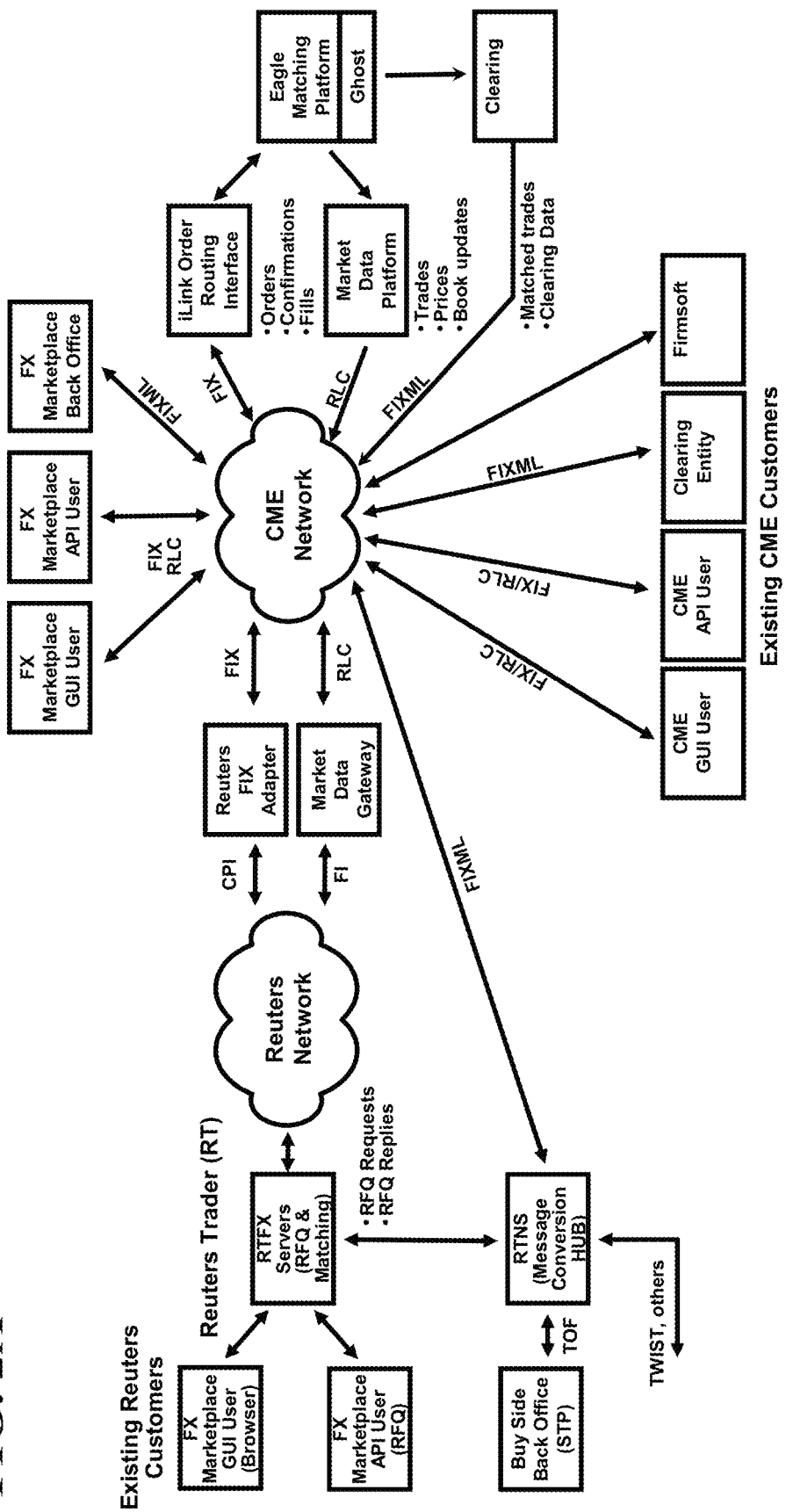
FIG. 2A shows a more detailed block diagram of the system of FIG. 1 according to one embodiment.
Figure 2B:
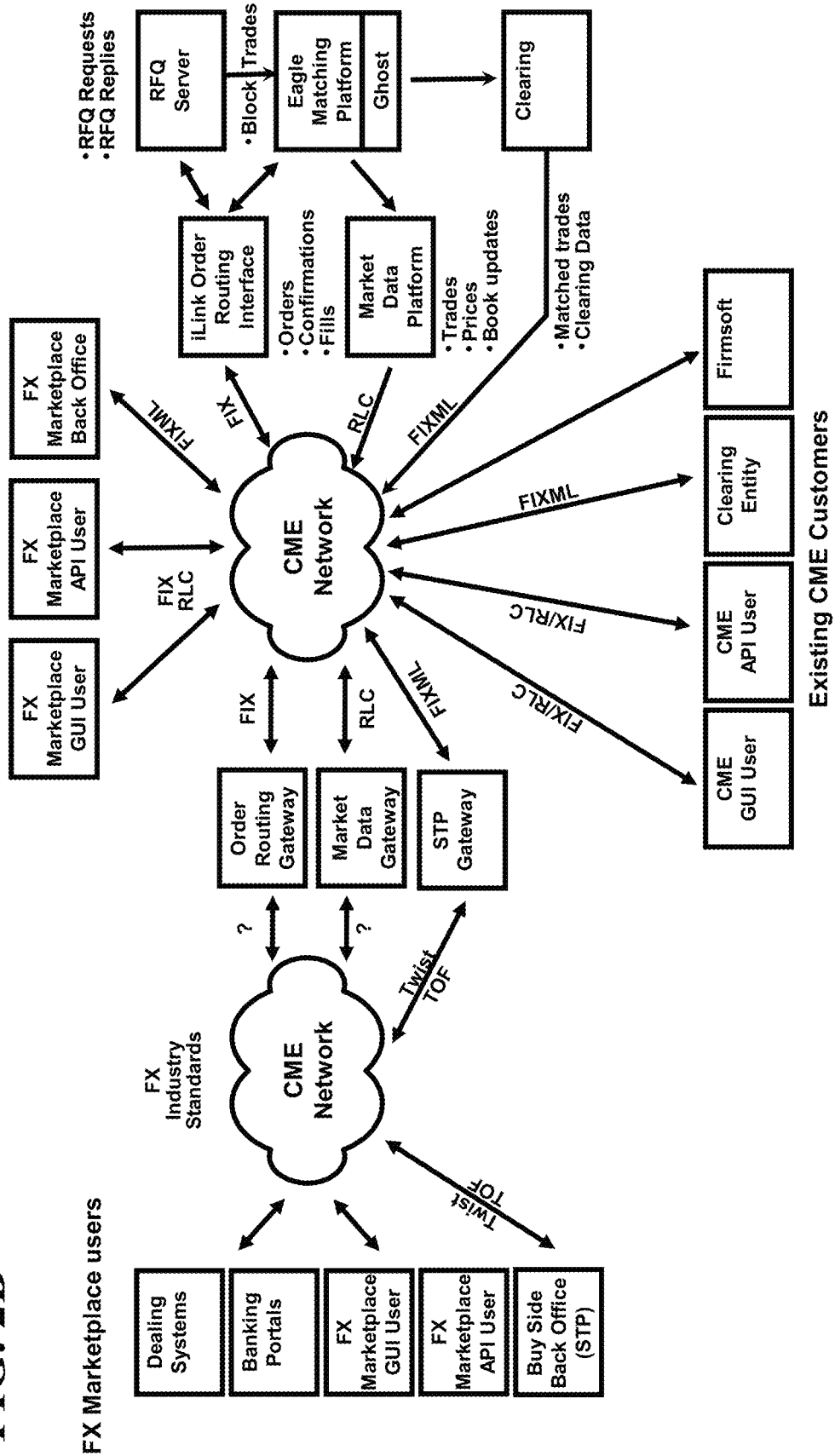
FIG. 2B shows a more detailed block diagram of the system of FIG. 1 according to an alternative embodiment.

FIG. 1 shows a block diagram of an exemplary system 100 for trading OTC FX instruments according to the disclosed embodiments. The system 100 is essentially a network 102 coupling market participants 104 106, including traders 104 and market makers 106 with the Exchange 108. Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed. The Exchange 108 provides the functions of matching 110 buy/sell transactions, clearing 112 those transactions, settling 114 those transactions and managing risk 116 among the market participants 104 106 and between the market participants and the Exchange 108, as well as request-for-quote functionality 118, as is discussed in more detail below. FIGS. 2A and 2B show more detailed block diagrams of the logical architecture of the system 100 of FIG. 1. In particular, FIG. 2A shows a block diagram of the system 100 according to one embodiment in which the Exchange 108 is interconnected with a second FX marketplace to allow existing FX market participants to transact over the Exchange as described herein. In this embodiment, the second FX marketplace is provided by Reuters. FIG. 2B shows a block diagram of the system 100 according to a second embodiment in which the Exchange 108 further provides connectivity to existing FX market participants.

While the disclosed embodiments relate to the trading of OTC FX instruments, the mechanisms and methods described herein are not limited thereto and may be applied to any OTC product.

Typically, the Exchange 108 provides a "clearing house" which is a division of the Exchange 108 through which all trades made must be confirmed, matched and settled each day until offset or delivered. The clearing house is an adjunct to the Exchange 108 responsible for settling trading accounts, clearing trades, collecting and maintaining performance bond funds, regulating delivery and reporting trading data. Essentially mitigating credit. Clearing is the procedure through which the Clearing House becomes buyer to each seller of a futures contract, and seller to each buyer, also referred to as a "novation," and assumes responsibility for protecting buyers and sellers from financial loss by assuring performance on each contract. This is effected through the clearing process, whereby transactions are matched. A clearing member is a firm qualified to clear trades through the Clearing House. In the case of the CME's clearing house, all clearing members not specifically designated as Class B members are considered Class A clearing members. In the CME there are three categories of clearing members: 1) CME clearing members, qualified to clear transactions for all commodities; 2) IMM clearing members, qualified to clear trades for only IMM and IOM commodities; and 3) IMM Class B clearing members, solely limited to conducting proprietary arbitrage in foreign currencies between a single Exchange-approved bank and the IMM and who must be guaranteed by one or more Class A non-bank CME or IMM clearing member(s). Note that a "member" is a broker/trader registered with the Exchange. As will be discussed below, in the disclosed embodiments, a new clearing member class may be introduced for the purposes of trading OTC FX, exclusively or along with other CME products, i.e. futures, as described herein. It will be appreciated that such classifications are implementation dependent.

In the presently disclosed embodiments, the Exchange 108 assumes an additional role as the central intermediary in OTC FX transactions, i.e., the Exchange 108 will become the buyer to each seller and seller to each buyer, and assume responsibility for protecting buyers and sellers from financial loss by assuring performance on each contract, as is done in futures transactions. As used herein, the term "Exchange" 108 will refer to the centralized clearing and settlement mechanisms, risk management systems, etc., as described below, used for futures trading, including the described enhancements to facilitate OTC FX transactions. By assuming this intermediary role and employing credit screening and risk management mechanisms, parties previously not able to trade OTC FX, because for example they were credit screened out, may now trade anonymously. In prior OTC FX markets, banks were the only sell-side to transactions. The presently disclosed embodiments permit traders to take either sell or buy-side positions and sell-side is no longer limited to banks.

While the disclosed embodiments will be described in reference to the CME, it will be appreciated that these embodiments are applicable to any Exchange 108, including those which trade in equities and other securities. The CME Clearing House clears, settles and guarantees all matched transactions in CME contracts occurring through its facilities. In addition, the CME Clearing House establishes and monitors financial requirements for clearing members and conveys certain clearing privileges in conjunction with the relevant exchange markets.

As an intermediary, the Exchange 108 bears a certain amount of risk in each transaction that takes place. To that end, risk management mechanisms protect the Exchange via the Clearing House. The Clearing House establishes clearing level performance bonds (margins) for all CME products and establishes minimum performance bond requirements for customers of CME products. A performance bond, also referred to as a margin, is the funds that must be deposited by a customer with his or her broker, by a broker with a clearing member or by a clearing member with the Clearing House, for the purpose of insuring the broker or Clearing House against loss on open futures or options contracts. This is not a part payment on a purchase. The performance bond helps to ensure the financial integrity of brokers, clearing members and the Exchange as a whole. The Performance Bond to Clearing House refers to the minimum dollar deposit which is required by the Clearing House from clearing members in accordance with their positions. Maintenance, or maintenance margin, refers to a sum, usually smaller than the initial performance bond, which must remain on deposit in the customer's account for any position at all times. The initial margin is the total amount of margin per contract required by the broker when a futures position is opened. A drop in funds below this level requires a deposit back to the initial margin levels, i.e. a performance bond call. If a customer's equity in any futures position drops to or under the maintenance level because of adverse price action, the broker must issue a performance bond/margin call to restore the customer's equity. A performance bond call, also referred to as a margin call, is a demand for additional funds to bring the customer's account back up to the initial performance bond level whenever adverse price movements cause the account to go below the maintenance. As will be discussed below, additional functionality is provided in the disclosed embodiments to provide risk management for OTC FX transactions.

The accounts of individual members, clearing firms and non-member customers doing business through CME must be carried and guaranteed to the Clearing House by a clearing member. As mentioned above, in every matched transaction executed through the Exchange's facilities, the Clearing House is substituted as the buyer to the seller and the seller to the buyer, with a clearing member assuming the opposite side of each transaction. The Clearing House is an operating division of the Exchange 108, and all rights, obligations and/or liabilities of the Clearing House are rights, obligations and/or liabilities of CME. Clearing members assume full financial and performance responsibility for all transactions executed through them and all positions they carry. The Clearing House, dealing exclusively with clearing members, holds each clearing member accountable for every position it carries regardless of whether the position is being carried for the account of an individual member, for the account of a non-member customer, or for the clearing member's own account. Conversely, as the contra-side to every position, the Clearing House is held accountable to the clearing members for the net settlement from all transactions on which it has been substituted as provided in the Rules. As will be explained below, these mechanisms will be augmented so as to handle OTC FX transactions.

More information about minimizing the risk to the Exchange 108 while similarly minimizing the burden on members, approximating the requisite performance bond or margin requirement as closely as possible to the actual positions of the account at any given time and improving the accuracy and flexibility of the mechanisms which estimate performance bond requirements, may be found in the following U.S. patent applications, all of which are incorporated by reference herein:

U.S. patent application Ser. No. 11/030,815, "SYSTEM AND METHOD FOR ACTIVITY BASED MARGINING", filed Jan. 7, 2005, now U.S. Pat. No. 7,769,667;

U.S. patent application Ser. No. 11/030,796, "SYSTEM AND METHOD FOR EFFICIENTLY USING COLLATERAL FOR RISK OFFSET", filed Jan. 7, 2005, now U.S. Pat. No. 7,426,487;

U.S. patent application Ser. No. 11/030,833, "SYSTEM AND METHOD FOR ASYMMETRIC OFFSETS IN A RISK MANAGEMENT SYSTEM", filed Jan. 7, 2005, now U.S. Pat. No. 7,509,275;

U.S. patent application Ser. No. 11/030,814, "SYSTEM AND METHOD FOR DISPLAYING A COMBINED TRADING AND RISK MANAGEMENT GUI DISPLAY", filed Jan. 7, 2005, now U.S. Pat. No. 8,849,711;

U.S. patent application Ser. No. 11/031,182, "SYSTEM AND METHOD FOR FLEXIBLE SPREAD PARTICIPATION", filed Jan. 7, 2005, now U.S. Pat. No. 7,593,877;

U.S. patent application Ser. No. 11/030,869, "SYSTEM AND METHOD FOR HYBRID SPREADING FOR RISK MANAGEMENT", filed Jan. 7, 2005, now U.S. Pat. No. 7,428,508; and U.S. patent application Ser. No. 11/030,849, "SYSTEM AND METHOD OF MARGINING FIXED PAYOFF PRODUCTS", filed Jan. 7, 2005, now U.S. Pat. No. 7,430,539.

In the present OTC FX markets, liquidity and access to pricing is fragmented creating inefficiencies for market participants. Such fragmentation is due in part to traditional reliance on bi-lateral counterpart credit that compartmentalizes trading, as well as the legacy role of banks as market makers to non-bank traders/firm. The centrally cleared marketplace for OTC FX provided by the disclosed embodiments permits access to the best pricing, equal access for all market segments, and buy-side and sell-side, as well as operational efficiencies, as will be discussed.

In bi-lateral trading, buyers and sellers essentially consummate deals on their own. Sellers must accept each buyer's credit, buyers send payment directly to each seller and buyers must accept each seller's ability to perform on the contract. If either party wishes to close out a deal prior to delivery, they must negotiate exclusively with their original counterparty. Such bi-lateral trading creates inefficiencies for the FX buy-side. For example, bi-lateral trading creates inefficient pricing in that the market consists of multiple trading counterparties and the requirement to open and close positions with the same bank. Further, bi-lateral trading creates inefficient use of collateral, e.g. there may be requirements to place margin at several banks, and creates excessive operational risk, e.g. multiple back-office confirmation relationships.

Present FX trade settlement utilizes the Continuous Linked Settlement ("CLS") Bank. Prior to the availability of the CLS Bank, FX trade settlements resulted in separate currency payments between trade counterparties, which incurred heightened risk that one party might default, especially in view of time zone differences, also known as "Herstaat Risk." The CLS Bank eliminates 'temporal' settlement risk by settling both sides of dual currency payments by delivery-vs.-payment, thereby mitigating Herstaat Risk in daily settlements.

Straight-Through-Processing ("STP") provides the benefits of reduction in errors during processing, acceleration of trade processing, real time risk management, automated account allocations, and back office staffing efficiencies. However, in the present OTC FX markets, the benefits of STP are limited by lack of standardization and real time delivery of both electronic trade affirmations and trade confirmations.

The disclosed embodiments offer reduced cost of market access, and thereby better access to best-pricing, lower infrastructure support costs and easier and less costly trade execution, price and volume transparency, efficient risk transfer, STP standardization and auditable prices and mark-to-market.

In particular, the disclosed embodiments feature centralized OTC FX execution and clearing via a centralized matching and clearing platform accessed, for example, via prime brokers/direct clearing. The disclosed systems and methods may be used by institutional participants in the OTC FX markets, such as banks, asset managers, leveraged trading firms (hedge funds, CTA's, prop firms, etc.), and/or currency program and overlay managers. The disclosed systems and methods may support OTC FX products, such as Spot, FX forward swap and FX options instruments. The disclosed systems and methods utilize trade matching technology as well as graphic user interface ("GUI") and application program interface ("API") based methods of interaction. Further, a novel request for quote process is provided. In the disclosed embodiments, clearing takes place via the Exchange clearing house, such as the CME Clearing House. Daily settlements may still occur utilizing the CLS bank but with added efficiencies which will be discussed below. Collateralized risk margining is also provided as will be discussed below. Further, OTC STP protocols are supported.

The disclosed embodiments provide value for the buy-side of OTC FX transactions. In particular, the disclosed systems and methods address customer demand for increased FX market efficiencies, pre-trade, trade and post-trade. For example, the disclosed embodiments provide access to trading lines and limits as well as audited and published FX price and volume data. Further, access to best pricing is provided as well as trade anonymity, improved execution speed, access to a primary liquidity pool, and access to multiple FX products. In addition, real time STP is provided as is efficient trade/position management via multi-lateral netting. Further all trading styles are accommodated, such as algorithmic trading, GUI/Keyboard trading and request for quote ("RFQ") based trading.

On the sell-side, the disclosed embodiments further provide value to banks. For example, they permit the ability to extend market making activities beyond the limits of bilateral credit relationships, e.g. trade with new customers, extend trading with existing customers, etc. Further, increased access to FX liquidity and accommodation of various trading styles is also provided. In addition, access to real time risk management and STP is provided along with credit and settlement risk mitigation.

In at least one of the disclosed embodiments, a hybrid market model may be provided which combines exchange central limit order book matching and bilateral trading of the OTC market with expanded electronic, anonymous access and clearing. Alternatively, other embodiments may provide sub-sets of this functionality.

The disclosed embodiments support one or more of the following FX instrument types: forwards, spot and swaps. Forwards refers to FX forward contracts that expire daily starting from tomorrow, i.e. the day after the transaction date, and running out for two years, for each currency-pair. A "Spot" refers the Forward which expires in two days after the transaction date. A swap is essentially a calendar spread, i.e. the simultaneous purchase (sale) of contract(s) in a near delivery month (first leg) and the sale (purchase) of an equal number of contract(s) in a far delivery month of the same contract (second leg), where the first leg is a Spot and the second leg is a further out Forward.

In one embodiment, a defined number of swap products are offered including Spot against the following (37 in total, assuming it the stated day or next day thereafter which is not a holiday in either currency):

Tomorrow—Tom Next (T/N)¬—The Swap which has a first Forward leg expiring tomorrow and the next Forward leg as "Spot"

The day after tomorrow—Spot Next (S/N)

Swap Forwards at 1 week, 2 weeks, 3 weeks

Monthly Swap Forwards from 1 month through 24 months

Except if this date is on a weekend or a holiday in either currency, go to the first preceding week date which is not a holiday in either currency Except if the spot value date is the last date of the month, then go to the last week date of the N'th month following which is not a holiday in either currency.

Swap Forwards at the 8 IMM dates over the next 2 years

Broken-Dated Swap—Any Swap which is not one of the pre-defined Swaps above.

It will be appreciated that other product combinations may also be offered.

Further, the disclosed embodiments utilize Daily Rolling Instruments wherein the contract symbol used by the customers to reference a given Swap or Spot does not change, day-to-day, but the Swap legs do change each day, i.e. the temporal references within the instrument are treated as relative to the transaction date rather than being expressed in absolute form thereby necessitating a significantly increased symbol set to reference them:

From the trader perspective, contract symbols for electronically matched instruments are "generic"—Fill messages include the value dates and prices of each leg;

Instrument definitions would therefore include contract symbols like "USDSPYSP" for Spot and "USDJPY1M" to specify the 1 month, forward Swap.

Each day, new instruments are used:

Forward for the 2 year date

All Swap instruments are refreshed with new legs

The appropriate value dates for electronically matched contracts are assigned by the system at match time and provided to the user within the order entry/front office fill messages for each leg. For Directed Request For Quote ("Directed RFQ" or "DRFQ"), discussed in more detail below, users may enter the desired legs for a Directed RFQ using generic contracts, with the requested value dates. For example, a user wishing to do an RFQ for a forward outright, i.e. an order to buy or sell only one specific type of contract, with a specific value date should be able to specify that, without having to specify a unique contract that is associated internally with that value date.

Referring to FIG. 3, in one embodiment, the Spot leg price is the mid-point between the bid/ask in the current Spot market or last traded within a specific time period; the other Forward leg price is made based on the Spot price plus the differential (e.g. "30" is a 0.0030 differential between the Spot and the Forward leg).

If the mid-point between the bid/ask in the current Spot market is stale, settlement information may be used. If the spot market is not liquid and no market data is currently being produced, customers will be kept up to date with secondary sources to minimize unexpected results when the leg price comes in. A business rule of having the Spot markets regularly quoted by market makers may be provided.

For some markets, the Swap does not use the Spot for that market, but rather an associated market. This is accomplished by doing a reciprocal (1/current-price) calculation of the spot, or spot mid-point in that associated market.

In the disclosed embodiments, for the purposes of determining the value date, value date conventions are employed. For example, the value-date convention for spot for USD/CAD is one business day and for all others it is two business days. A value date is valid for a currency pair if it is a banking business day for both currencies of the pair. Trading may physically occur on any weekday. However, for trading occurring on any given weekday, the rule for taking holidays into account when determining the value date for "spot" trading on that weekday differs depending on the currency in which the holiday occurs. For holidays in USD, you need only one full working day before you can settle a spot trade. For example: Wednesday July 4th (US Independence Day), a USD holiday; Monday's spot trading in USD/JPY has value date Thursday (because Wednesday is a USD holiday); Tuesday's spot trading in USD/JPY also has value date Thursday (because you only need one USD working day). For holidays in currencies other than USD, two full working days before settlement may be required. For example: Wednesday December 7th (Pearl Harbor Day), a JPY holiday; Monday's spot trading in USD/JPY has value date Thursday (because Wednesday is a JPY holiday); Tuesday's spot trading in USD/JPY has value date Friday (because Wednesday is a JPY holiday and you need two full working days in JPY).

In the disclosed embodiments, support for the instruments listed in Table 1 is provided. It will be appreciated that the instrument offerings may vary and are implementation dependent. In particular, the Central Limit Order Book ("CLOB") will support Spot and/or standardized Swap forwards. The Directed RFQ mechanism, discussed in more detail below, will support Spot, Forwards (any date out to 2 years), Swap forwards (standardized cases), Broken-dated swaps, or combinations thereof.

TABLE 1

| Currency Pair | Shorthand | Quoted In | Spot Trading Unit | Swap Trading Unit | Spot Tradable via CLOB | Swaps Tradable via CLOB | Number Contracts via CLOB | Number Contracts Including Forwards |
|---|---|---|---|---|---|---|---|---|
| Euro - USD | EUR/USD | USD | EUR | USD | x | x | 38 | 541 |
| USD - Japanese Yen | USD/JPY | JPY | USD | USD | x | x | 38 | 541 |
| British Pound - USD | GBP/USD | USD | GBP | USD | x | x | 38 | 541 |
| Australian Dollar - USD | AUD/USD | USD | AUD | USD | x | x | 38 | 541 |
| USD - Swiss Franc | USD/CHF | CHF | USD | USD | x | x | 38 | 541 |
| USD - Canadian Dollar | USD/CAD | CAD | USD | USD | x | x | 38 | 541 |
| Euro - Japanese Yen | EUR/JPY | JPY | EUR | | x | | 1 | 504 |
| Euro - British Pound | EUR/GBP | GBP | EUR | | x | | 1 | 504 |
| Euro - Swiss Franc | EUR/CHF | CHF | EUR | | x | | 1 | 504 |
| British Pound - Japanese Yen | GBP/JPY | JPY | GBP | | x | | 1 | 504 |
| Japanese Yen - USD | JPY/USD | USD | | JPY | | x | 37 | 541 |
| Swiss Franc - USD | CHF/USD | USD | | CHF | | x | 37 | 541 |
| Canadian Dollar - USD | CAD/USD | USD | | CAD | | x | 37 | 541 |
| | | | | | | total | 343 | 6885 |

* Swaps are not listed for the non-USD currency pairs.

In disclosed embodiments, three currency-pairs will have a secondary market for the alternate listing (e.g. a ¥/$ contract and a $/¥ contract will both exist, as completely separate markets):

Japanese Yen
Swiss Franc
Canadian Dollar

Forward outright instruments will be quoted in terms of one currency only (e.g. a $/¥ Forward is quoted in JPY, not USD). Swap instruments will be quoted in differential.

In the disclosed embodiments, there are 10 currency pairs, but only 6 with swaps defined. Contract sizes will be 1 million units of the base currency. Instruments tick in tenths, not quarters nor in a variable tick table (VTT).

With regard to daily value date roll-over, users need only be notified that the value date has changed for the Spot and Swaps, rather than what the change is for each instrument. In one embodiment, users are notified as to what the current value dates are for each instrument. Participants can request value dates for each instrument from the marketplace.

A new flag on the Instrument Definition market data message is provided (the MO, em-oh) which is available for use in this market. One example usage could be in the situation where each instrument was listed individually. This flag could change daily for many of these instruments, as indicated by the "Tradable" flags in the table above.

In one embodiment, any of the listed forwards, while not on a central limit order book, may be traded via the Directed RFQ system (noted below). Traders may also use the Directed RFQ system to dynamically create a Broken-dated Swap market consisting of those Swaps not pre-defined (i.e. those which have a non-standard forward leg). These markets are also not on a central limit order book.

It will be appreciated that the foregoing instrument definitions and conventions are implementation dependent and suitable modifications to accommodate alternative instruments and conventions are contemplated herein. For example, while it is advantageous to utilize existing product symbology and instrument standards in the FX market place today, other symbology or standards, now available or later developed, may also be used with the disclosed systems and methods.

To facilitate clearing of OTC FX products using the clearing and settlement mechanism, the disclosed embodiments feature a new class of clearing member for banks and prime brokers addition to existing Clearing house members. Existing Exchange membership may be used to trade on this new market as well. Further, for the disclosed embodiments, only Institutional users will be permitted to use the platform (no retail). Clearing firms will have to guarantee that their customers meet the established criteria for access. These criteria may be based on capitalization. The same single risk pool will be used for the safeguard system. In alternative embodiments, the market participants may be defined differently.

With regard to market access, authorization may be required before order entry can occur. Authorization should occur at the SubscriberAlias (originating location of the order) as well as the TraderID (order originator) and/or Account (entity on behalf of which the order is being submitted) level of granularity but may affect the registration process. In one embodiment, authorization occurs by TraderID and/or Account. In one embodiment authorization is for the entire market rather than granular to currency pair The application of a central counterparty to OTC FX transactions permits additional functionality to be offered to OTC FX market participants. In one embodiment, netting is provided which allows various FX positions to be netted together for settlement rather than separately settled, thereby reducing the number of settlement transactions and the associated transaction costs. The individual transactions are still tracked and reported but the actual number of settlement transactions, for example, those sent to CLS, is reduced. In another embodiment, collateralization is provided which allows the value of an entity's FX account, which may change in value via debits and credits but not based on the actual movement of value, to be used against that entity's margin requirement of their futures trading account, thereby simplifying margin requirements and reducing the overall burden.

In one embodiment, as shown in FIG. 2A, CME provides clearing and settlement functionality while a separate market, such as Reuters, provides matching functionality and access to sell-side entities, such as banks. In an alternate embodiment, as shown in FIG. 2B, CME provides matching, clearing and settlement functionality. It will be appreciated that the division of functionality for in-taking, processing and completing a given transaction is implementation dependent.

In order to implement OTC FX within the clearing and settlement mechanisms of the Exchange, additional market functionality is needed, such as: match engine functionality; surveillance, market control and registration functionality; RFQ functionality; market data functionality; trade data functionality; clearing/trade reporting/straight-through-processing ("STP") functionality; fee functionality; and front-end/distribution functionality.

In particular, the match engine matches up sell-side and buy-side orders to complete trades. In one embodiment, the match engine utilizes a first-in-first-out ("FIFO") matching algorithm for Spot transactions and a FIFO with Lead Market Maker matching algorithm for Forward Swap transactions. In this embodiment, simple market maker protection is provided for Forward Swap transactions. Mass quoting is also permitted with Forward Swap transactions.

In one embodiment, specific features are provided for forward swap markets. In particular, approximately 10 to 20 Market Makers are targeted for the forward Swap markets, across all markets. Leg pricing for swaps is done on a differential basis, given the derived spot price and the swap differential.

In one embodiment, the allocation will respect the 1 million currency base unit contract size (i.e. products trade in base units of 1 million). The match engine is not required to have credit controls nor is it required to track the position of traders. Traders must know the delivery/value dates of all leg fills. This can be accomplished either via the fill notification, a daily instrument creation market data message, or some other standardized electronic means.

Traders need to get leg fill notifications with prices immediately after a match. Accordingly, order entry leg messages back to the trader for forward swaps should reflect one Spot leg, with its associated value date, and a generic forward leg, with its associated value date. This is true regardless of whether the messages are generated as the result of an electronic match, or a Directed RFQ-based block trade. Further, order entry leg messages back to the trader for Spot contracts should reflect the generic Spot contract and its associated value date, regardless of whether the messages are generated as the result of an electronic match, or an Directed RFQ block trade. In addition, order entry leg messages back to the trader for forward out-rights should reflect the generic forward outright, and it's associated value date. Note that such messages can only be the result of an execution from a Directed RFQ block trade, since forward out-rights will not be electronically matched.

The Trading Engine must produce information on a trade as to whether a given side was the aggressor order (i.e. the non-resting order). This is for the purposes of the fee functionality, discussed below.

Implied functionality, as discussed in more detail below, may also be provided.

The matching engine may support one or more of the following order types, or combinations thereof:
  Fill and Kill ("FAK") & Limit orders;
  RFQ for quantity will be available for those markets which are traded in a central limit order book;
  Stop Orders and Stop Price Logic;
  Good Til Cancel ("GTC") order types;
  Good Til Day ("GTD") order types;
  Block trades;

The match engine may also provide consolidated fill reporting (front-office, back-office, and market data)

The Match Event/Trade Report to Clearing may need to include information about the entire spread. This will require either using the D1 message (as well as the MD from the Match Engine to Clearing, or a new interface/message altogether. See the Section below on Clearing/Settlement for more information.

In one embodiment, the market will operate in continuous trading all week (24 hours×5.5 days), with existing trade date rollover daily:
  Markets open at 11:45 AM Chicago time on Sunday for a Monday trade date.
  There may be no trade date rollover at 4:00 PM on Sunday;
  Markets close weekly at 4:00 PM on Friday;
  There is no maintenance window from 4:00 PM to 5:00 PM. There may be no IOP-like opening state;
  The cutoff to the next trading day occurs at 4 PM Chicago time (5 pm New York time);
  Markets are open on most normal holidays;
  All orders remain on book. On trade date rollover the legs of that Swap are redefined (perhaps as an entirely new market, but with the same External ID/Contract Symbol); and
  If there is open interest in a Swap or Spot market on trade date rollover, the orders remain actionable in that "generic" market, but if traded will have new leg forward instruments.

The Surveillance, Market Control & Registration functionality provides audit, security and authentication services. In one embodiment, order management tools are provided such as CME's FirmSoft, which is a browser-based order management tool that provides real-time visibility into working and filled orders, across multiple firm IDs, in the CME® Globex® Order Management database. Accessible through the CME portal (via the internet) or through a production connection to the CME Globex platform, CME FirmSoft provides important alternative access to working and filled orders during system failures Globex Control Center ("GCC") must have current capabilities provided with Eagle/Ghost for Market Surveillance
a. Status/Cancel Working Orders
b. Status Mass Quotes
c. Status/Bust Trades
d. Status Blocks
e. Plus
  1. Surveillance by value-date
  2. Agent shall use single Ghost instance to be able to perform status across FX Marketplace and other CME markets
  3. Status on Directed RFQ requests and responses can be done in the same way as RFQ's are currently, but with information on both parties available
  4. Differences in terms & convention between the end trader & GCC need to be taken into account for all tools (generic instruments, value dates, etc.)

The system may make available the following audit reports
  Order & trade activity—overall and per market
  Directed RFQ request and response activity—overall and per market
  A given Market Maker's activity in the above The Exchange will control the account numbers that are authorized in this market and for or each new participant, a unique account number is created The set of registration data that should be collected for this marketplace is similar to existing data for other markets:
1. First Name
2. Last Name
3. Date of Birth
4. Social Security #
5. Work Phone
6. Work fax (mandatory)
7. Email (mandatory)
8. Mobile Phone
9. City of birth
10. Secondary School
11. Trader ID(s) authorized
12. Account #s (new addition but see below already part of TeleStat)
13. Interfaces used
  a. iLink 2
  b. EOS
  c. Globex trader
  d. Firmsoft
  e. FX Marketplace
14. Contact type
  a. Technical
  b. Market
  c. Firm Admin Primary
  d. Firm Admin Secondary
15. TeleStat
  a. Security Question
  b. Security Answer
  c. Trading Address
    i. City
    ii. Country
    iii. State
  d. Tag 50/Sender Sub ID
  e. Firm and Account #Combinations
16. Authorized Contact Signature
17. Clearing Firm Representation and Agreement
  a. Name of clearing firm
  b. signature of officer
  c. name of officer
  d. title
  e. date
18. Customer Representation and Agreement
  a. name of customer
  b. signature of officer
  c. printed name of officer
  d. title
  e. date The FX Marketplace may require an error trade policy that will be administered by the Globex Control Center ("GCC"). Existing error trade tools may be used. GCC should have current capabilities provided by ETP plus, as information about the spread will be passed to clearing, the ETP system should allow inquiry based on this criteria The Clearing House will provide each day the most economically appropriate end of day settlement prices need to be determined for open contracts, with no need for operations or GCC support.

Figure 6:
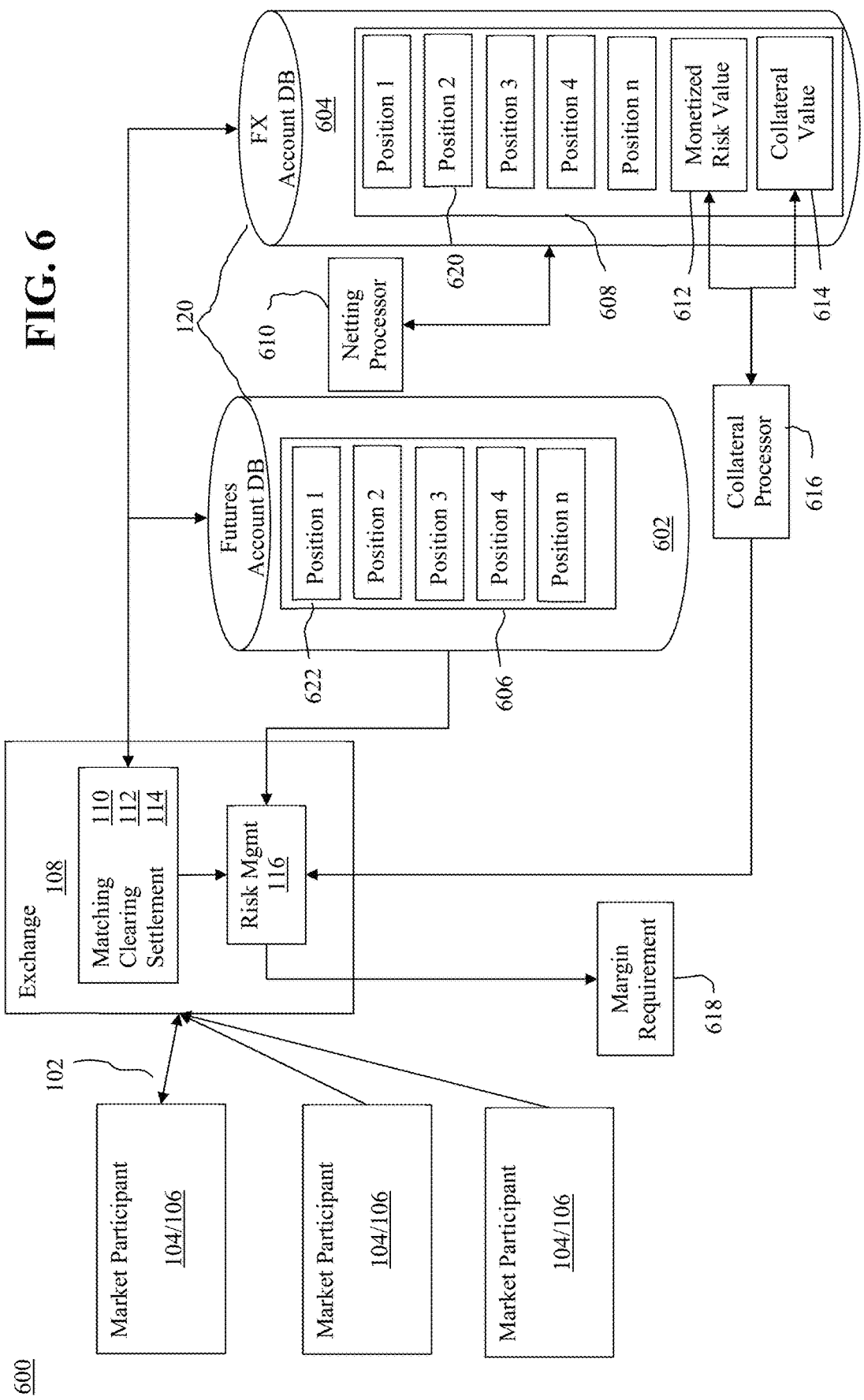
FIG. 6 depicts a more detailed block diagram of the system of FIG. 1 according to one embodiment.

FIG. 6 shows a more detailed block diagram of the system 100 of FIG. 1 according to one embodiment. As was described above, the market participants, e.g. traders 104 and market makers 106, interact with the Exchange 108 to match 110, clear, 112 and settle 114, transactions. Risk management functionality 116 is provided which monitors and manages margin requirements, etc., as was described above, to manage and mitigate the risk undertaken by the Exchange 108 and the market participants 104/106 ensuring a stable market. The Exchange 108 further includes one or more account databases 120 which store records reflecting, tracking and/or recording the transactions undertaken by the market participants 104/106 and/or the results thereof. For example, as a market participant 104/106 places orders, completes transactions or otherwise creates positions 620, 622, i.e. matches, settles and clears trades, the account database(s) are updated to reflect those transactions and/or positions 620, 622, thereby allowing the associated market participant 104/106, as well as the Exchange, to audit, account for, and manage trading activity.

In one embodiment, a futures account database 602 is provided which maintains account records 606 for market participants 104/106 related to their trading activity of futures instruments. Further, a separate FX account database 604 is provided which maintains account records 608 for market participants 104/106 related to their trading activity of FX instruments. It will be appreciated, that while the databases 602, 604 may be logically distinct, they may be implemented in a single storage medium and/or data structure and that such arrangements are implementation dependent and may be further subject to regulatory control.

As discussed above, by acting as an intermediary between market participants 104/106 for the transaction of FX instruments, the Exchange 108 obviates many of the requirements of a bilateral system of trading. In particular, the Exchange novates itself into the transactions between the market participants, i.e. splits a given transaction between the parties into two separate transactions where the Exchange substitutes itself as the counterparty to each of the parties for that part of the transaction, sometimes referred to as a novation. In this way, the Exchange acts as a guarantor and central counterparty and there is no need for the market participants 104/106 to disclose their identities or subject themselves to credit or other investigations by a potential counterparty. For example, the Exchange insulates one market participant from the default by another market participant. Market participants 104/106 need only meet the requirements of the Exchange 108. Anonymity among the market participants 104/106 encourages a more liquid market environment as there are lower barriers to participation.

In addition, by acting as an intermediary, the Exchange 108 is able to provide additional functionality that may not be available in bilateral contracting situations. In one embodiment, the Exchange 108 provides a netting processor 610 coupled with the FX account database 604 which analyzes and/or correlates the various positions 620 within a given account 608 to automatically recognize and/or net positions 620 together where applicable. For example, when a particular market participant 104/106 holds positions 620 which are offsetting with respect to one another, those positions 620 may be netted together. Such netting may reduce and/or eliminate a particular obligation associated with a position 620, thereby reducing the number of settlement transactions that the market participant 104/106 must engage in at the time of settlement. In a bilateral trading environment, offsetting positions 620 may not be netted together as they may be held with respect to different counterparties, possibly under different contractual conditions. Accordingly, the market participant 104/106, in a bilateral trading environment, must settle each position 620 individually. Effectively, the Exchange's role as a central counterparty to transactions consolidates the transacting parties to just the Exchange and the transacting market participant thereby allowing any correlation and subsequent netting of positions to be performed independent of the market participant engaging in the counter-transaction or holding the counter position. With respect to the transactions themselves, the net result between the bilateral environment and the central counterparty environment of the disclosed embodiments may be the same once all positions have been settled or otherwise reconciled. However, there are associated costs with each settlement transaction. Accordingly, by reducing the number of settlement transactions, the transaction costs in the central counterparty system of the disclosed embodiments are reduced as compared with the costs incurred in the bilateral environment.

In yet another embodiment, the Exchange 108 provides a Collateral processor 616 which is operative to determine a collateral value 614 of a given FX account 608 of a market participant 104/106 and provide this collateral value 614 to the risk management functionality 116, such as a risk processor, of the Exchange 108 to be used in offsetting the margin requirement 618 of that market participant's 104/106 Futures account 606. This is referred to as collateralization. In particular, a given FX account 608 will have both a monetized risk value 612 and a collateral value 614 associated with it. The monetized risk value 612 is the monetary value of risk associated with all of the positions 620 in the account. The monetized risk value 612 may be computed similarly to the margin requirement of a future account as has been described. Assuming there has been no collateralization yet of the particular account 608, the collateral value 614 represents the amount of the monetized risk value 612 that the Exchange 108 is willing to allow the market participant 104/106 to pledge against the margin requirement of their Futures account 606. Initially, the collateral value 614 may equal the monetized risk value 612 or may be slightly less, accounting for a "haircut" reduction to prevent the market participant from pledging the entire value of the account 608. On a periodic basis, as was discussed above, the Exchange's 108 risk management functionality 116 calculates the margin requirement 618 of the market participant's futures account 606 based on the positions 622 held within the account 606. Once the margin requirement 618 has been computed, the market participant 104/106 may then be permitted to pledge the some or all of the available collateral value 614 of their FX account 608 to reduce the margin requirement. Where the collateral value 614 exceeds the margin requirement 618, the margin requirement 618 may thereby be satisfied and the collateral value 614 is reduced by the amount pledged. This remaining collateral value may be available to be used against future requirements. However, where the collateral value 614 does not satisfy the margin requirement 618, the margin requirement 618 and collateral value 614 is reduced accordingly and a reduced margin requirement 618 is presented, e.g. a margin call, to the market participant for appropriate satisfaction. As the positions 620 of the account 608 may fluctuate with the activity of the market, the monetized risk 612 and collateral 614 values may similarly fluctuate. This fluctuation will further be reflected in the computation of the margin requirement 618. Overall, collateralization reduces the burden on the market participant 104, 106 to meet the margin requirement 618 of his Futures account 606 by allowing them to leverage value that is already being held by the Exchange 108.

It will be appreciated that the netting processor 610, collateral processor 616, as well as the other functionality of the Exchange 108, including the matching 110, clearing 112, settlement 114 and risk management 116 functionality, may be implemented in hardware, software or a combination thereof. In particular, the exchange 108 may provide a matching processor 110, clearing processor 112, settlement processor 114 and risk processor 116 to implement the disclosed functionality. Further, this functionality may be implemented in logic or computer program code stored in a memory and executable by one or more processors which may be directly or indirectly connected, such as via a network.

Figure 7:
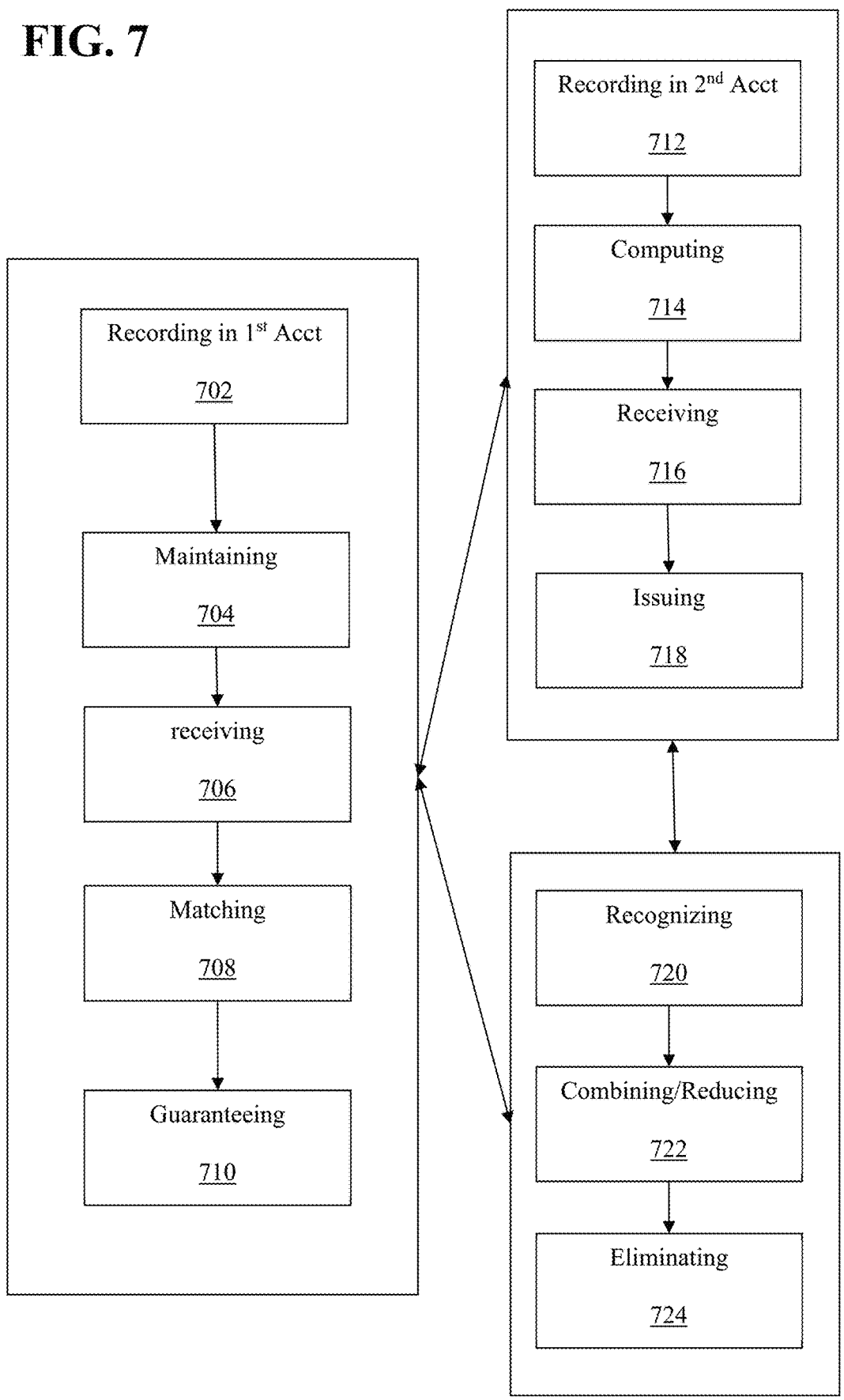
FIG. 7 depicts flow charts showing the operations of the system of FIGS. 1 and 6 according to one embodiment.

FIG. 7 depicts flow charts showing the operations of the system of FIGS. 1 and 6 according to one embodiment. In particular, in one embodiment, a method of trading financial instruments among a plurality of entities, i.e. market participants 104, 106, participating in a market is provided, where the financial instruments include foreign exchange instruments. The method utilizes an intermediary, i.e. a central counterparty, which, in one embodiment, is an Exchange 108 such as the CME. The method includes recording, in a first account 608 associated with a first entity 104, 106 of the plurality of entities 104, 106, a first plurality of positions 620 resulting from transactions related to one or more of the foreign exchange instruments (block 702). The method further includes maintaining the first account by the intermediary 108 (block 704) and receiving from the first entity 104, 106, by the intermediary 108, a request to transact in a particular foreign exchange instrument (block 706). In response thereto, the method further includes matching the request to transact with a counter request received from a second entity 104, 106 of the plurality of entities and facilitating an exchange of the particular foreign exchange instrument without identifying the first and second entities to each other (block 708) and guaranteeing, by the intermediary, that neither the first nor second entity will default on their request (block 710).

In an alternate embodiment, wherein the financial instruments further include futures instruments, the first account 606 may be characterized, based on the first plurality of positions 620, by a monetized risk value 612 and a collateral value 614, the collateral value 614 representative of the monetized risk value 612 less any value pledged as collateral. In this embodiment, the method may further include recording, in a second account 606 associated with the first entity 104, 106, a second plurality of positions 622 resulting from transactions related to one or more of the futures instruments, the second account 606 being characterized by a net position representative of the offset of one or more of the second plurality of positions 622 against another one or more of the second plurality of positions 622 (block 712). The method may further include computing a margin requirement 618 for the second account 606 based on the net position (block 714) and receiving a pledge of a portion of the collateral value of first account to cover the margin requirement of the second account (block 716). In addition, wherein the margin requirement is not satisfied by the pledged portion of the collateral value, the method may further include issuing a margin call to the first entity to fulfill the remaining margin requirement (block 718).

In yet another alternative embodiment, netting may be provided wherein each of the first plurality of positions is associated with an obligation subject to subsequent settlement. In particular, in this embodiment, the method may further include recognizing a first one or more obligations/positions which correlate with a second obligation (block 720) and combing those obligation to create a net obligation/position, whereby the second obligation/position may be reduced (block 722) and eliminating the second obligation where it is nullified (block 724), whereby fewer obligations/positions may remain for subsequent settlement.

The disclosed embodiments also feature Directed RFQ functionality. In particular, this functionality permits anonymous and private requests for quote, i.e. the request-recipient is unaware of the identity of the requestor but responses are still routed back solely to the requestor. In prior OTC FX markets, transactions were bilateral and therefore the transacting parties were known to each other, thereby stifling some potential transactions. Parties needed to know each other so as to evaluate credit risk, etc. In the presently disclosed embodiments, the centralized clearing mechanism eliminates the credit risk to the parties, as was described above, and permits transacting parties to remain anonymous, with the clearing mechanism acting as the intermediary and risk buffer. Further, in prior RFQ systems, requests might be directed to particular market makers but the responses thereto, i.e. actionable quotes, were broadcast back the market generally, increasing the risk/exposure of the responder. In the disclosed Directed RFQ system, requests are anonymized and then routed to all of the market makers, or alternatively only to an appropriate subset of market makers based on the parameters of the request (discussed in more detail below). Responses/actionable quotes are then routed back only to the requestor rather than the entire market, thereby limiting the exposure of the actionable quotes and reducing the exposure of the responder(s).

In one embodiment, the Directed RFQ functionality operates as follows:
1. A requestor wants to trade a specific amount of a particular instrument through a Directed RFQ. In one embodiment, the Directed RFQ communication includes size, price, side (optional), notional amount, product (currency pair), delivery date and Time to Live ("TTL"):
   a. The specific size can be down to the whole unit ($1) is not constrained by the "contract size";
   b. Directed RFQ has a minimum and maximum quantity range, defined by currency pair and product type. The minimum can be lower than the contract size (1 million);
   c. The front-end should be able to display the quantity requested in terms of notional amount;
   d. The trade is all-or-nothing between two counter-parties—partial fills or not possible (but may be possible in alternative embodiments);
   e. In one embodiment, any market participant can submit a Directed RFQ;
   f. In one embodiment, the requestor may specify sell-side or buy-side with the system hiding this information from the market makers;
2. A publicly distributed Directed RFQ is broadcast to all, or alternatively, subset of, market participants;

a. This initial Directed RFQ has auto-cancel functionality known as the Time-To-Live (TTL), which is entered by the requestor;
b. The TTL is part of the public Directed RFQ and is sent out over market data;
c. After the TTL expires, the initial Directed RFQ is cancelled;
   i. In one embodiment, all Directed RFQ Responses which have not been accepted are canceled;
   ii. In one embodiment, no more Directed RFQ Reponses are accepted;
3. The trading community responds to the public RFQ with a Directed RFQ Response (new message type);
   a. Any market participant may respond to the Directed RFQ;
   b. Each quote may have auto-cancel functionality known as the Time-To-Live ("TTL");
   c. The TTL is entered by the responder, as part of the Directed RFQ Response;
   d. Expired responses receive cancel messages;
   e. Responders can also cancel their quotes at any time;
4. A Directed RFQ system manages all Directed RFQ Responses it receives;
   a. These responses are not put into the public order book, but are sent to the original requester only;
   b. Only the Directed RFQ originator can observe Directed RFQ Responses, along with the TTL associated with each response;
   c. Each quote is anonymous—containing only the price and TTL. In one embodiment, whether the request is a buy-side or sell-side request may be omitted;
5. The Directed RFQ originator can select from any of the live quotes in this private order book;
   a. Once a quote is accepted, the Directed RFQ system then automatically sends in a Privately Negotiated Trade ("PNT")/Block order for the exact notional amount, on behalf of the two parties;
   b. All other quotes are immediately cancelled. Cancel messages to all other responders;
   c. The Directed RFQ itself is "cancelled" and no more Directed RFQ Responses will be accepted for it;
6. Both parties receive normal iLink & Clearing trade reports, subject to the Consolidate Fill requirements below;
   a. The system will optionally update the market volume and other market data statistics based on appropriate configuration settings.

The Time to Live ("TTL") parameter may be specified as an absolute time of expiration, such as a set time, or a relative time, e.g. a duration measured from some common reference or origin. In one embodiment, transmission delays in the DRFQ, or in the responses thereto, are accounted for in computing the TTL window and determining when responses are properly received therein. In one embodiment, Global Positioning System ("GPS") receivers or some other form of universal time reference, such as a network time reference, e.g. network time protocol ("NTP"), at each point of transmission may be used to provide accurate time synchronization and transmission delay detection. Alternatively, the system may ignore transmission delays, relying on a central time keeping mechanism as the ultimate arbiter.

In embodiments where Directed RFQ's are routed to only a select subset of market makers, the selection may be based on trader and/or market maker profile information known to the system. Selective routing thereby minimizes quote traffic. In both a broadcast and selective routing environment, incentives may be put in place to encourage recipient market makers to respond to the Directed RFQ. Incentives may include trading fee discounts or other incentives. Alternatively, penalties may be implemented to penalize recipient market makers who fail to respond. Penalties may include fines, increased trading fees, trading restrictions or other penalties.

The Directed RFQ mechanism manages all Directed RFQ traffic through the system. In one embodiment, in-bound requests are received and a unique identification number is generated and associated with the request, such as in a log. For example, the request messages/packets, having a particular data structure, may be received into a buffer storage which holds the request for subsequent processing. A computer or other number generator then generates a unique value which is concatenated or otherwise associated with the request, such as by being inserted into the data structure. The Directed RFQ is then pushed out to the market, i.e. broadcast to the market makers, all or a subset thereof, utilizing the identification number in place of the originator/requestor's identification information to identify the Directed RFQ. For example, the various data from the request data structure may be copied into a new message having a similar data structure including the unique identification number but omitting the originator/requestor's identification information. The central system maintains a cross reference database/log of the Directed RFQ identification numbers and the associated requestor identity so as to associate and route responses appropriately, e.g. at the same time that the anonymous request message is generated, the data is stored in the cross-reference database. This database may be maintained in a memory or other storage device.

In one embodiment, individual Directed RFQ Responses may have TTL which extends beyond the expiration of the original Directed RFQ Request. This is acceptable, and Directed RFQ Responses which have not yet expired are fully executable against by the Directed RFQ originator.

In one embodiment, the Directed RFQ system is managed via a central server process. In the event of an "in flight" situation (such as a Directed RFQ Response being cancelled or otherwise expiring while the RFQ originator's acceptance is "on the wire"), whichever request is processed by the Directed RFQ central server first, wins. Other transaction coherency protection mechanisms may also be provided.

Mechanisms may also be provided to allow requestors to manage pending Directed RFQ requests and responders to manage pending responses. This would allow a requestor, for example, to track which Directed RFQ's are active, how long they have to live, the present response status, etc. For responders, the mechanisms permit them to know what actionable quotes are still live and how long they have to live. This would allow, for example, a responder to manage responses to multiple Directed RFQ's to the same product so as not to over expose themselves. For example, an application program interface ("API") may be provided which allows requestors and/or responders to access and/or modify the internal database/tables maintained by the DRFQ system to manage requests and responses and their associated TTL's as will be described. The API may be a simple command and control interface which receives command/control messages, executes the command contained herein and send back a response message to the sender based thereon. Alternatively, the API maybe a web based interface providing a secure media-rich interactive client application permitting the described management tasks.

FIG. 4 shows an exemplary business message flow for the Directed RFQ functionality of the disclosed embodiments. It will be appreciated that other messaging protocols may also be used to achieve the disclosed functionality. Further, it will be appreciated that the media over which the Directed RFQ messaging traffic flows is implementation dependent and may include wireless and wired networks, private and publicly accessible networks, or combinations thereof.

In response to a Directed RFQ, there may be multiple responses from various interested parties. These responses may be generated substantially simultaneously or over a window of time as the various parties receive and react to the Directed RFQ. Further, the transmission of the Directed RFQ as well as the responses thereto, may be subject to various network latencies between and among the disclosed system and the transacting parties. Further, each response may include different parameters, including a different TTL. In one embodiment, the Directed RFQ is matched to the first response which meets the requested parameters, i.e. the business requirements specified by the request originator, and all other responses are rejected. This matching may be automatically performed by the system or, alternatively, responses may be routed back to the originator who then selects the response they wish to trade with based on criteria of their choosing. In one embodiment, the originator may select a desired response based on at least the price wherein the system then automatically selects among the available responses at that price via the mechanisms described below. It will be appreciated that many different matching/selection mechanisms may be utilized ranging from fully automated systems to fully manual systems, and all such systems are contemplated herein.

In an alternate embodiment, the Directed RFQ central server may maintain a private order book on behalf of the originator which is maintained, for example, until the TTL of the Directed RFQ expires. Mechanisms may be provided which balance the parameters of each response against the parameters/requirements of the Directed RFQ so as to match the most optimal response(s) with the request. For example, a "window of opportunity" may be defined in which responses are allowed to accumulate before evaluating those responses and matching to the most optimal. Such factors considered in matching requests with responses may include the price, quantity, TTL (of the request and/or the response), or combinations thereof. Once the "window of opportunity" closes, all subsequently received responses are rejected even if they may be more optimal than an accepted response. In one embodiment, the "window of opportunity" may be dynamic and may be based on the latest expiring response which meets one or more of the request parameters. Alternatively, the "window of opportunity" may be statically defined or may be defined by a parameter of the Directed RFQ itself on a transaction by transaction basis, such as by the TTL of the Directed RFQ. Typically, the requestor will desire a long TTL on the responses to allow for the best selection of quotes while the responder will want a short TTL on the response to minimize exposure/risk. Once the window closes, the central server evaluates the received responses and takes the best price which matches the originator's requirements (as stated in the Directed RFQ). The system may then execute a block trade on behalf of both parties to complete the transaction. In one embodiment, multiple responses which tie for the best price or otherwise meet the requirements may be subject to selection by First in First Out, or other arbitration mechanism such as round-robin. Once the transaction is complete, fill notifications are sent back to both parties, etc.

Given the transmission latencies noted above, a given response may arrive at the system later than a later-generated response or miss the TTL of a given Directed RFQ, and may therefore miss a matching opportunity, depending on the transmission latencies in the system. In one embodiment, logic is included to evaluate responses based on the time they are generated and the time they are actually received to mitigate "in-flight" discrepancies and otherwise maintain coherency between Directed RFQ's and the responses thereto, ensuring equal opportunity to the market participants and minimizing re-transmission of requests and responses.

In one embodiment, Directed RFQ transactions occur outside of the normal central order book. In an alternative embodiment, a particular Directed RFQ may be allowed to match against the central order book where a suitable order is present.

In one embodiment, conditional responses to a Directed RFQ may be supported allowing a responder to attach conditions to their response/actionable quote. Matching of the response to the request factors in whether the specified conditions are met, in addition to other factors.

In an alternative embodiment, indicative quoting is also supported allowing market makers to publish indicative quotes to the market place and invite Directed RFQ's from interested parties prior to issuing actionable quotes.

More information regarding Directed Requests For Quotes may be found in U.S. patent application Ser. No. 11/452,653, entitled "SYSTEM AND METHOD FOR DIRECTED REQUEST FOR QUOTE", filed Jun. 14, 2006, and published as U.S. Patent Application Publication No. 2007/0118455 A1, the disclosure of which is herein incorporated by reference.

In one embodiment, Mass Quoting and associated market maker protections are supported for Directed RFQ trade flow. Where market maker protections are triggered, by either a Directed RFQ or CLOB-based mechanism, both the MassQuotes in the existing CLOB markets would be canceled and, additionally, any active Directed RFQ responses would also be immediately cancelled by the system.

In one embodiment, the market maker protections include those provided by the CME Falcon trading engine and include protections specified in Table 2 below.

Table 2

10. Falcon provides Enhanced Market Maker Protection
10.1 Falcon restricts the number of fills, the number of matched trades, or the number of contracts occurring within a CME defined time interval.
10.1.1 The restriction time is defined at the Group Level.
10.1.2 Market Maker protection applies to MASS QUOTER's only.
10.1.3 Market Maker Protection (MM Protection) applies to incoming Mass Quotes and resting Mass Quotes only.
10.1.4 Market Maker Protection applies to each side of a Quote separately.
Note: Market Maker Protection does not apply to Orders submitted by a Market Maker.
10.1.5 The CME defined time interval (variable N) is input via FAS and is applied at the Group level.
10.1.5.1 The variable N is only applied to Products eligible for Mass Quotes.
10.1.5.2 The variable N is based on a Trading Engine established heartbeat.
10.1.5.3 The heartbeat will commence randomly at start-up.
10.1.5.3.1 The heartbeat will commence at the same time for each Group.
10.1.5.4 The variable N may be changed on a real-time basis.

10.1.5.4.1 A variable N change takes place at the end of the current N period.

10.1.5.5 The variable N is maintained for MASS QUOTERs at the Group Level.

10.1.5.6 N resets at the end of N time period, whether market action occurs (execution/quote entry/etc.) or not.

10.1.5.7 Mass Quoters setting/resetting MM Protection to Y enter the N time period in progress. Note: no unique N time clock for MQ.

10.1.5.8 N variable is maintained at Millisecond level-ssSSSS.

10.2 Falcon realizes three protection mechanisms applied at the group level for MASS QUOTERs: New Fill Protection (X), Execution Protection (Y), Quantity Protection (Z)

10.2.1 New Fill Protection (X)-Falcon tracks the total new quote executions per new quote side for all instruments within a Group for a MASS QUOTER.

10.2.1.1 A count starts at 1 for a Group when an execution occurs for a new quote side.

10.2.1.1.1 The size of the executions and number of executions do not affect the count for the specific instrument's quote side.

10.2.1.1.2 Executed Cancel/Replace and New Mass Quotes occurring within the N time period for an instrument's quote side within a group increment the count by 1.

10.2.1.2 The count increments by 1 for a Group for every execution occurring against a new quote on a quote side for an instrument group within the N time interval.
Note: New quote is defined a modification of an existing quote or a quote entered after a total fill for an instrument.

10.2.1.3 New Fill Protection (X) is determined by the MASS QUOTER and is modifiable at the FAS.

10.2.1.3.1 Setting the New Fill Protection to 0 turns off the protection.

10.2.1.4 The count X is reset every time a new N time interval starts.

10.2.1.5 Mass Quote Cancels do not impact the value of X.

10.2.1.6 MM protection is triggered when X is greater than or equal to the MASS QUOTER defined X value.

10.2.2. Execution Protection (Y)-Falcon tracks the total number of executions per quote side for all instruments within a Group for a MASS QUOTER.

10.2.2.1 A count starts at 1 for a Group when an execution occurs for a quote side.

10.2.2.2 The count increments by 1 for a Group for every execution occurring against a quote on a quote side for an instrument (in the Group) within the N time interval.

10.2.2.3 Execution Protection (Y) is determined by the MASS QUOTER and is modifiable at the FAS.

10.2.2.3.1 Setting the Execution Protection (Y) to 0 turns off the protection.

10.2.2.4 The count Y is reset every time a new N time interval starts.

10.2.2.5 Mass Quote Cancels have no impact on the value of Y 10.2.2.6 MM protection is triggered when Y is greater than or equal to the MASS QUOTER defined Y value.

10.2.3 Quantity Protection (Z)-Falcon sums the total quantity of executed trades per quote side for all instruments within a Group for a MASS QUOTER.

10.2.3.1 Aggregation starts for a Group when an execution occurs for a quote side.

10.2.3.2 The sum increases for a Group by the trade quantity amounts occurring against quotes on a quote side for an instrument (in the Group) within the N time interval. [Note: quantity in instrument, not leg totals of instrument]

10.2.3.3 Quantity Protection (Z) is determined by the MASS QUOTER and is modifiable at the FAS.

10.2.3.3.1 Setting the Quantity Protection (Y) to 0 turns off the protection.

10.2.3.4 The sum Z is reset every time a new N time interval starts.

10.2.3.5 Mass Quote Cancels have no impact on the value of Z 10.2.3.6 MM protection is triggered when Z is greater than or equal to the MASS QUOTER defined Z quantity value.

10.3 Market Makers determine the X, Y, and Z values at the Group Level.

10.3.1 Falcon engine maintains the MM defined X, Y, Z values at the Group Level.

10.3.2 X, Y, Z values are entered and maintained via the FAS at the Group level.

10.3.3 X, Y, Z values are modifiable on a real-time basis.

10.3.3.1 Changes do not take effect until the end of the N time period.

10.3.4 X, Y, and Z data type is Long 10.3.5 X, Y, and Z values can be between 0 and max. value.

10.3.6 X, Y, and Z cannot be negative.

10.3.7 If the Fill Protection count is greater than X, or the number of executions greater than Z, or the quantity of contracts traded is equal to or greater than Y per Group within the N interval, MM Protection is triggered.

10.3.7.1 When MM Protection is activated, Falcon cancels the Quotes for all instruments within the Group for the MASS QUOTER's SenderCompID.

10.3.7.1.1 Quote Entries within the Mass Quote message which trigger MM protection are cancelled and added to the Number of Cancels Accepted field. Cancel/Replace QuoteEntries are only counted once.

10.3.7.1.2 The QuoteEntry which triggers MM Protection generates an execution.

10.3.7.1.3 Any remaining quantity is cancelled and added to the Number of Cancels Accepted field.

10.3.7.2 Falcon sends a Mass Quote Cancel Confirmation message with a Quote Status of F.

10.3.7.3 MM Protection is not enforced when the X, Y, Z variables are met in mid-matching.

10.3.7.4 MM Protection is triggered after the quote which causes the X, Y, or Z variable to trigger completes a matching process.

10.3.7.5 Mass Quote messages which trigger MM Protection are returned an Ack before cancellation message.

10.3.8 When MM Protection is triggered, Falcon does not accept any new Mass Quotes for a MASS QUOTER in the triggered Group.

10.3.8.1 Falcon rejects Mass Quotes for the MASS QUOTER in the Group.

Message Reject Code and Reason Text will denote that MM Protection has been initiated.

Message Reject Code=00

Message Reason Text=" "

10.3.8.1 Falcon accepts Quotes in the triggered Group if the Market Maker Protection reset flag Tag 9773 has been reset to Y in a Mass Quote Msg by the MASS QUOTER.

10.3.8.1.1 The value received from the MASS QUOTER is echoed back to the MASS QUOTER.

10.3.8.1.2 If the value of the reset flag is N and MM Protection is in effect, Falcon sends the following reject:
Quote status=5
Reject code=98
Reason Text="Market Maker Protection"

10.3.8.1.3 After the MASS QUOTER submits the Protection Reset flag set to 'Y', they may continue to enter Mass Quotes with the flag set back to 'N'.

10.3.8.2 Falcon accepts Quotes in the triggered Group if the Market Maker Protection reset flag Tag 9773 has been reset to Y for the MASS QUOTER by the GCC via FAS.

10.3.8.3 The MM Protection is triggered if an inbound Mass Quote message contains more than 110 invalid quotes.

10.3.8.3.1 If more than 110 quotes within a Mass Quote message are invalid, the Falcon rejects the entire message and cancels all resting quotes in the Group for the MASS QUOTER.

10.3.8.3.1.1 Reject and cancellation occur whether MM Protection flag is on or off.

10.3.8.3.1.2 Mass Quote Cancel Confirmation Message set as follows: Cancel_Status="F", Reject_Code=00, Reason_Text=" "

10.3.8.3.1.3 Falcon will continue to reject Mass Quotes until the MASS QUOTER receives a Protection reset flag in a Mass Quote Message 10.3.8.3.1.4 Subsequent Mass Quotes Messages received before reset will be rejected and sent a Mass Quote Confirmation message with a Quote Status of 5.
Message Reject Code=98
Message Reason Text="Market Maker Protection"

10.3.8.4 In the event of a Falcon Engine restart, new MassQuote Messages are accepted regardless of the Protection Reset flag.

10.3.8.5 Falcon does not reset Market Maker Protection status when entering the close or pause state.

10.3.8.6 Falcon does reset Market Maker Protection on the last scheduled close of a trading week.

10.3.8.7 MM Protection is on if X, Y, Z has values present.

10.3.8.8 MM Protection is off if X and Y and Z have 0 values.

10.3.8.9 MM Protection default value is 0 for X and Y and Z.

10.4 Over two N time periods, the worst case exposure for a Mass Quoter is two times the X or Y or Z variable minus 2 of that variable.

10.5 Falcon executes ACKs for MQ quotes before Canceling when MM Protection is triggered.

In the disclosed embodiments, the Market Data functionality ensures that market data is efficiently and accurately communicated to the market participants. All market data for these markets may be in notional terms, i.e. expressed as the face value of the underlying instruments on which derivatives are traded, but other representations may be used.

Market data for the Central Limit Order Book may include:
The market depth of the Top of Book MA message (and Implied Top of Book MY message) at 5.
Consolidated fills
Spreads and legs and/or spread quantities
Market data for the Directed RFQ may include:
The request message (and expiration message);
The fill and fill price.

In the disclosed systems, quotes and order book updates are anonymous and Traders cannot directly advertise their quotes.

Market statistics may include:
Update volume, high, low, last from central limit order book;
For block trades in this market, the market data statistics, such as the overall volume, high, low and last, will be updated based on the existing rules (these rules are defined in the EOS 2.0 RFC/Blocks feature set);
For Directed RFQ In the disclosed embodiments, for Swap trades, market data for Spot and the Forward outright legs is disseminated. For reciprocal markets, those which use a Spot from another associated market, this market data must be rounded in some fashion.

In the disclosed embodiments, the Trade Data functionality ensures that trade and order data is efficiently and accurately communicated to the market participants.

Consolidated fill notifications need to be distributed immediately after a match, independent of the venue the match occurred:
Notification to the front-end;
Notification to the clearing house;
Notification to the trade (account) owner's clearing firm;
Notification to a trader's back office system (open question);
Notification to market data (conditional on venue);
Consolidated Fill:
Front-end—sending only a single fill notification per aggressor order, per price level, regardless of the number of counterparties;
This could be accomplished either via modifying existing iLink FIX messages (and overall messaging model) or via message aggregation on the front-end;
Back-end—similar to the front-end consolidation, there would only be a single notification per aggressor order, per price level, regardless of the number of counterparties and individual trades involved. It may be critical to this portion of the Consolidated Fill is that the consolidation rules match the Front-end rules exactly.
Fill notifications should include
Forward swaps—the Swap with the differential, the Spot leg with its associated value date, and the forward leg with its associated value date.
This will require either using the D1 message (as well as the MD from the Match Engine to Clearing, or a new interface/message altogether. D1 and M1 are trade messages sent by the trading engine to the clearing and reporting organizations. See the Section below on Clearing/Settlement for more information;
Spot contracts—the generic Spot contract and its associated value date;
Forward out-rights—the generic forward out-right, and it's associated value date.

In the disclosed embodiments, counterparty information may not be included in the fill notification:
To the front-end;
To the clearing firm.

Trade reporting maintains the original trade price & date to match cash market convention. Trade reporting is currently done via FIX ML and TREX, while the industry standards in OTC FX such as TOF, TWIST, & SWIFT. In the disclosed embodiments, clearing supports trade messages in these major OTC FX formats. In one embodiment, DealHub or a similar service can be used to convert from an originating CME format to one of these OTC FX standards.

Trade reporting is done in notional amount, rather than in quantity of the contract, using FIX ML as an originating CME formats.

In the disclosed embodiments, the Clearing/Trade Reporting/STP functionality essentially performs the trading functions of the Exchange. Clearing handles all instrument creation & modification for the Match Engine. As noted above, the Swap contract symbols do not change daily. In one embodiment, each day the most economically appropriate end-of-day settlement prices for open contracts needs to be determined, so as to mark open positions to market. Daily settlements will result in unrealized gain/loss. Pending deliveries, unrealized losses will be collateralized (rather than daily banking of that mark-to-market amount).

The collateral requirements are based on:

The exact amount of unrealized gain/loss so far;

The maximum reasonably likely loss over the next trading day, as determined by SPAN according to parameters we set; and CLS requirements for capital against expected settlement obligations;

Settlement/trade reporting contains information on the spread traded as well as the outright legs (with the implied linkage between legs & spread present):

Clearing will optionally compress trades, based on client/CLS need (note that this is not pre-netting, as that would zero out a buy & sell whereas compression would not);

Clearing will optionally pre-net trades, based on client/CLS need;

This pre-netting or compression can be done on a per currency level of granularity;

All settlements will be made through Continuous Linked Settlement Bank (CLS);

For normal open positions with the two-day value date convention, we will be sending transactions to CLS between 4 and 5 pm Chicago time—needs to be validated against existing OTC practices;

Normal clearing settlement-cycle timelines will not be affected and will remain 7 pm for completion of all post-trade activity prior to the second day before the value date; and Settlement reports are generated for each clearing firm enumerating each account's specific activity.

In an alternative embodiment, support for Bilateral Credit, Give-Up's, Average Pricing (APS) and Single Line Entry of Differential Spreads (SLEDS) is provided.

Post-Trade Account number modifications are not allowed in this market

For Clearing/Trade Reporting, as mentioned above, the disclosed embodiments may use one of several options which are implementation dependent:

1. Pre-net each side by trade; or
2. Pre-net each side by trade date.

CME Clearing House can settle directly through CLS for each clearing firm. If that clearing firm has CLS standing instructions for a given account, CME can clear through CLS to the account level.

In the disclosed embodiments, the Fee functionality permits the Exchange to charge transaction fees and other wise obtain compensation for use of the provided trading mechanisms. The Fee functionality accounts for trading and other activities and appropriately obtains compensation from the transacting parties.

For the purposes of Fees, this will be a new class of market participant.

The system will have the ability to fee by the following:

Discrete quantity tiers; and/or

Aggressor orders.

All quantity is in notional terms.

This market will be a "Payout" versus a "Revenue Share"

The attributes or qualities of a Market Maker, for the purposes of Fees only, can be defined in the following terms:

SubscriberAlias— Where the order is coming from (i.e. a desk);

TraderID— Who the order is coming from; and

Account—For whom is this order.

The buy/sell file from Clearing must include the 'aggressor order' indicator as well as information about what product this trade was a part of (specifically, in the case of a Swap, the buy/sell file typically only includes the legs, with no reference to the spread).

There is the potential for a negative fee.

The Fee functionality handles the new transaction type which is the Block trade resulting from a Directed RFQ which is different from a normal Block or Ex-Pit transaction.

In one embodiment, a variable fee structure may be provided in which fees vary as a function of the risk of the transaction and/or of the trading party.

The Front-End/Distribution functionality of the disclosed embodiments include the interfaces, e.g. Application Program Interfaces ("API's"), GUI, etc. which permit the receipt of orders, Directed RFQ's, etc. from the market participants and the dissemination of trade and market data to the market participants.

Access and market data for Independent Software Vendor ("ISV") and Proprietary front-ends into the Central Limit Order Book ("CLOB") and Directed RFQ will be available through API's:

In one embodiment, CME will distribute this new market via iLink 2.0, CME's market data API, only, with the required API enhancements to encompass the new order types and this marketplace; and This market will use the existing market data infrastructure.

API access will be made available to any approved entity as determined by FX Marketplace:

FX Marketplace must be able to prevent selected front-ends and data centers from accessing it (for example EBS);

ISVs may also be permitted to create access for authorized users (i.e. OTC market ISVs) via a GCC operated registration process. These markets are not generally available to all traders on the ISV network;

A front end may take one of three forms:

Deal with Reuters, using the existing CME interfaces (updated iLink 2.0 API, Clearing link described above, market data);

New product development, either internal or through a joint venture dependency; or Update and existing CME front end (EOS/GL/CME-.com).

In one embodiment, the front-end is browser based, rather than a stand-alone application. The front-end must know the real-time, full product definitions, inclusive of value dates for Spot and Swap markets. ISV's may also be permitted to create access for authorized users (i.e. OTC market ISV's). This system is not generally available to all traders on the ISV network.

The Distribution/Front-End system employed here would optionally conform to the Consolidated Fill guidelines mentioned above. In one embodiment, the system has the ability to deliver this information in the required industry formats currently used in the OTC FX space.

In one embodiment, additional trading functionality is provided to transacting parties. For example, in one embodiment, Implied Spreads in Currencies are provided. This function permits implying/interpolating price in one of multiple inter-related markets based on (sufficient) pricing data known in the remaining markets. Exemplary inter-related markets are: spot rate/swap rate/forward outright; cross currency (A/B, B/C, A/C) (across or within product lines), e.g. dollar/yen-yen/euro-dollar/euro; and between broken dates. In the case of an incoming order for a swap market in currency A/B, the swap is broken down into its two forward legs for said currency pair. These legs can be used to imply open interest in reciprocal markets or in those forward markets using either specific currency.

In another embodiment, Intra-Firm Match Avoidance protections are provided to prevent a particular entity from transacting with itself. The system prevents firms or traders from matching with themselves in any of the central limit order book markets. This may be accomplished using information on the order at the trader, desk, or firm level of granularity. When an aggressor order is matching the resting book and the opposite order has been deemed to be unmatchable, there are several options: The aggressor order is cancelled before any matching occurs; or The aggressor order matches normally and any resting order it attempts to match with, which is deemed unmatchable, is cancelled immediately. In either case, appropriate fill and cancellation messages are sent to the parties involved, per normal operations of those actions (order cancel and trade).

In another embodiment, Universal Pass Through is provided which allows parties to swap interest rates among currencies where the clearing house takes over the credit risk/funds transfer mechanism.

Figure 5A:
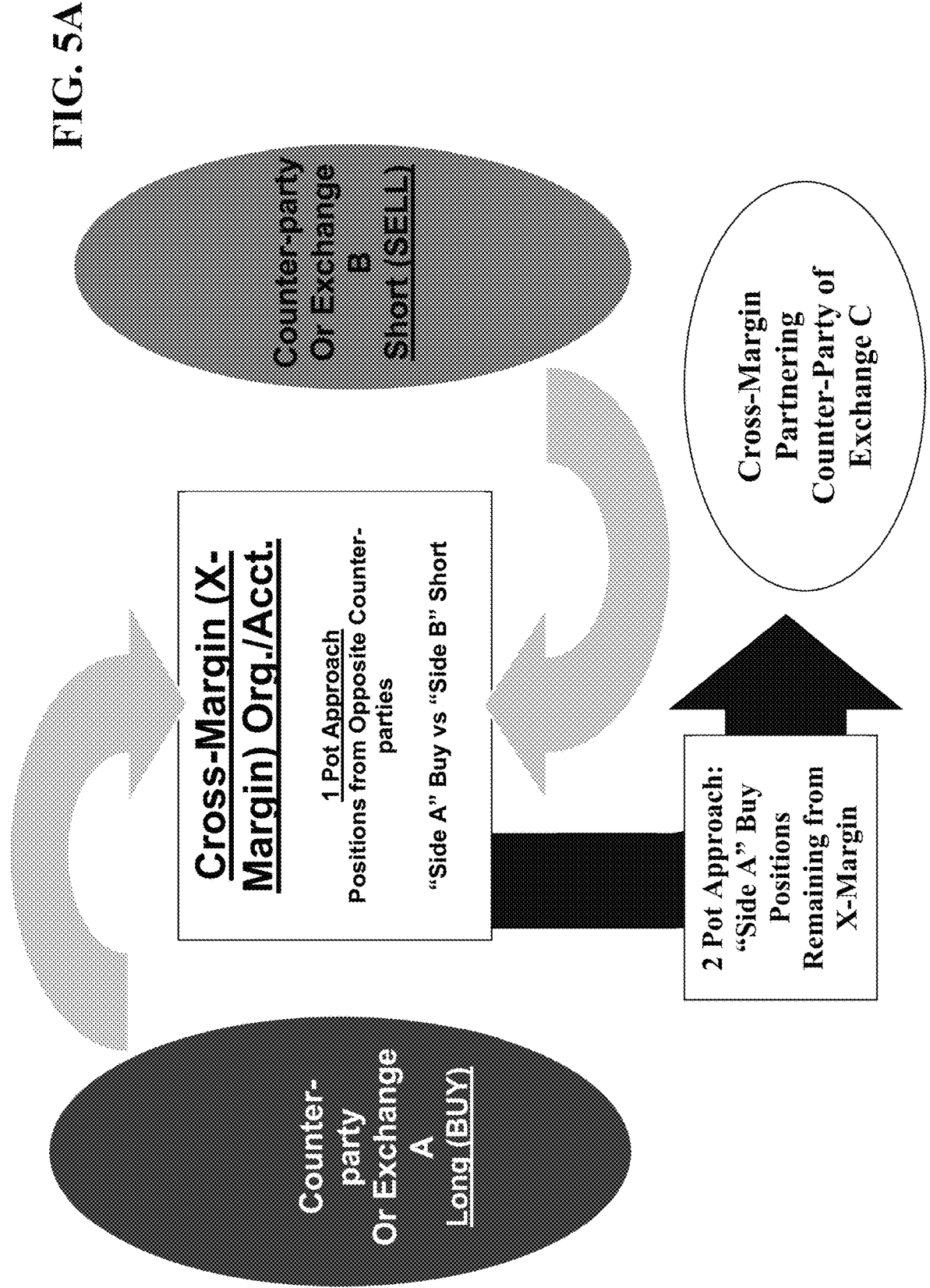

In another embodiment, shown in FIG. 5A, Flexible Hybrid Central Counter-party Cross-Margining or Cross Collateralization is supported. In particular, one-bucket and two-bucket cross-margining or collateralization processes are combined into a single streamlined process. Cross-Margining or Cross-Collateralization allows for a reduction in margin or collateral amount requirements for trading in either OTC or exchange traded derivatives markets. This reduction is possible because assessed risk is reduced when offsetting (risk-offset or 'Spreadable") positions are cleared by the same or affiliated "clearing members" or market participant firms at the cross-margin participating central-counterparty clearing organization(s).

In the present embodiment, both one-bucket and two-bucket cross-margining or collateralization processes are combined into a one streamlined and single process by combining 'One-pot Approach' and 'Two-pot Approach' to support both OTC and exchange traded derivatives clearing transactions. Process 1: 1 Pot Approach is initially achieved with two or multiple partnering parties. Process 2: 2 Pot Approach is achieved with one or multiple partnering parties dealing with risk-offset eligible positions after the process 1 is done.

Referring to FIGS. 5B and 5C, the 1 Pot Approach is shown:
 Clearing Transactions Scope Participants: clearing members of exchange or counter-parties in the OTC market
 Multiple contracts or products of all types (both OTC and exchange traded) at different exchanges or counter-parties
  All Cross-Margin Activity=Joint Cross-Margin/collateral Account
  Identified with a Separated into Cross-Margin Origin
  It is separate from participant's normal clearing at respective clearing organizations, entities or counter-parties.
 Only ALLOW Cross-Margin/Collateral Eligible Trades to Clear in the Joint Cross-Margin/Collateral Accounts
 Trades executed directly into the Cross-Margin Accounts
 Positions can be transferred between a normal Clearing Account and Cross-Margin Clearing/Collateral Account.
 Separate Position Records/Data is submitted for the Cross-Margin process Origin
 Banking Settlement or collateralization only Dedicated to the Joint Cross-Margin Accounts
 Treated as Separate Origin
 Separate Bank Accounts, Wires, Transactions, etc.

Referring to FIG. 5D, the 2 Pot Approach is shown:
 Transactions of Participating Clearing Organizations=Occurs at Each Clearing Org.+Offset Risk=2 Pot
 No Joint Cross-Margin Accounts
 No Separation from Clearing Member's Primary Clearing Account at respective clearing organizations
 Hold Collateral in the Same Separate Firm Accounts
 Each Participating Organization Calculates its PB Requirements, Offset and Share Offset, Gain & Loss Guarantee Information
  Positions Remain at each participating organization origin
  No Need for Position Transfer into Cross-Margin Account
  No Separate Position Change Submission (PCS) report is Needed Transparent Transaction
  For example,
 CME offers credit on cross-margin eligible contracts for offsetting positions at the opposite clearing organizations
  Opposite Clearing Org. will offer credits on their positions.
  No Dedicated Banking Settlement for Cross-Margin Purposes
  No Separate Bank Accounts, Wires, Transactions, etc.
  Transactions become part of current banking transactions.

In the 2 Pot approach, Cross-Margin Offsets are Calculated as follows: Internal Process for Cross-Margin Eligible Product:
 1. Do all Internal Intra-Commodity Spreading.
 2. Do all Internal Inter-Commodity Spreading.
 3. Look at the available cross-margin delta positions at other clearing organizations to see if additional spreads could be formed from CME's remaining delta positions.
 4. Allocate Prioritized Spread Credit to each Clearing Organization
  i.e. Multiple organization cross-margin program.
  Assign Priority from Highest to Lowest spread credit amounts based on the information from other participating clearing organizations.
  Calculate the Spread Allocation based on the priority.

Figure 5E:
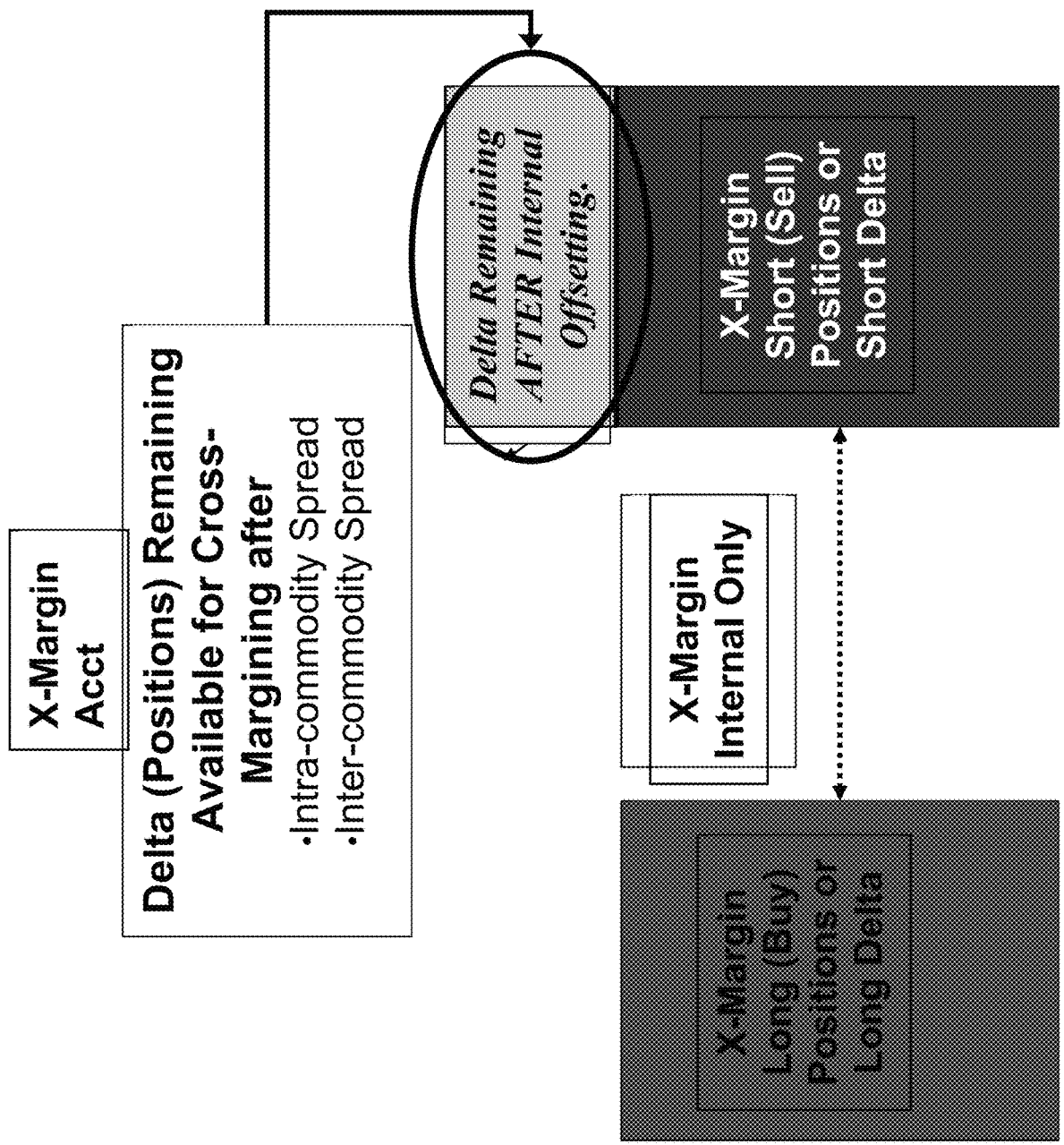
Figure 5F:
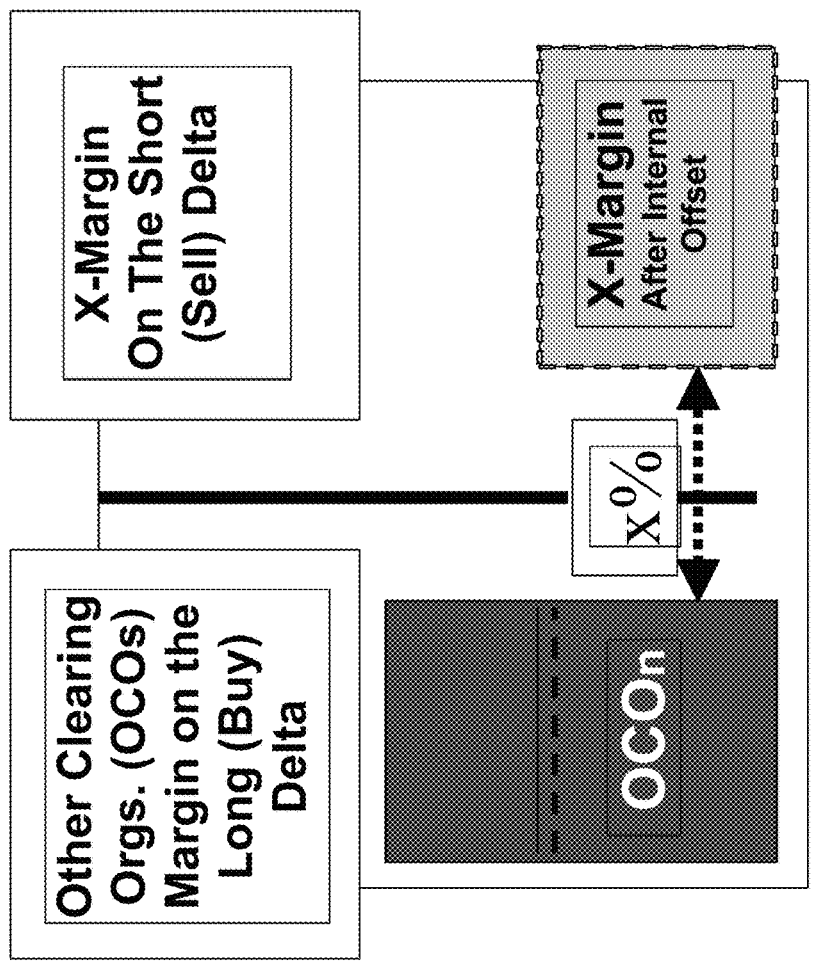

FIG. 5E shows the process for dealing with positions that were not originally offset. FIG. 5F shows how cross-margining utilizes X-margin margin that was not offset. FIG. 5G demonstrates how cross-margining matches positions of similar absolute risk at two or more clearing organizations.
 Allocation of Savings on Proportional Basis:
 Cross-Margining with Multiple Organizations,
 Allocation of its Positions and Margin necessary
 Allocations Will Optimize Members' Margin Reductions Amounts are First Allocated to Products With Best Correlations
  If Equally Correlated, Allocations Are Pro-Rata Based on Margin Amounts Submitted by Each Clearing Organization

| Exchange | CME | LCH | GSCC |
| --- | --- | --- | --- |
| Eligible Contract | Eurodollar | Euribor | Treasury Eq. |
| Eligible Delta | 1000 | −700 | −500 |
| Spread Credit % | | 80% | 35% |
| Spreads Formed | 1000 | −700 | −300 |
| Remaining Delta | 0 | 0 | −200 |

The 2 pot approach offers the advantages of: flexibility in managing collateral is unaffected using "Two Pot" Approach; avoids legal and operational complexities of establishing and maintaining joint margin Accounts in a multiple-clearing organization cross margining environment; the ability to pledge margin collateral for liquidity purposes is unaffected; and there is no operational impact except in performing an audit trail.

In another embodiment, pricing of the swap legs, using the mid-point in the spot market is provided, with error handling where the spot market is illiquid. In particular, as used herein, "Spot" refers to the day on which deals agreed today are actually carried out. In the foreign exchange markets, spot is usually two working days ahead; so for deals concluded on Tuesday, spot is Thursday; for deals concluded on Friday, spot is Tuesday (unless bank holidays intervene). A spot deal is a simple exchange of two volumes of currency to take place two working days ahead—in other words, with a value date of spot. The foreign exchange rates commonly quoted in the media are spot rates—the rates agreed in today's spot deals. The term "Outright/Forward" refers to a simple Forward exchange of two volumes of currency where the value date is any date other than spot. The rate for the deal is normally quoted as a premium or a discount ('negative premium') on top of the current spot rate. So the formula for the dealt rate (the rate specifying the relationship between the two volumes) is:

Dealt Rate=Spot Rate+Premium, or
Dealt Rate=Spot Rate−Discount

In a swap deal, a volume of one currency is exchanged for a volume of a second currency. After an agreed period, the transaction is reversed. It is possible for the volumes in the second 'leg' of the transaction to differ from the first. For example, a deal might specify that at spot:

Bank A pays 5,000,000 US Dollars to Bank B
Bank B pays 7,565,000 Swiss Francs to Bank
A (Rate 1.5130)
. . . and that three months later:
Bank B pays 5,000,000 US Dollars to Bank A
Bank A pays 7,530,000 Swiss Francs to Bank
B (Rate 1.5060)

The difference in the rates of the second currency for the two legs of the swap deal arises from differences in the deposit rates for the two currencies, and expectations about variations in the spot rates.

In one embodiment, the disclosed system will:
Price a Spot and Forwards in absolute terms (i.e. the rate); and
Price Swap in differential terms.

When a trade on a Swap occurs, the system has the agreed upon differential between the Spot and the Forward leg. At this point, the system anchors the Spot for the transaction as the mid-point between the bid/ask in the current Spot market.

Additionally, four alternative mechanisms for how to assign the leg prices to the CME FX Swaps are provided if there are no bid and ask prices for a given currency in CME FX Spot:

1. Use Reuters contributor spot FX pages (such as EUR=, JPY=, CAD=, GBP=, CHF=, AUD=) and take the average of the spot bid and ask quotations at the time of the trade;

2. Use Reuters Dealing Terminal Quotations (perhaps utilizing information from CME GFX) for the target currencies and calculate the average of the spot bid and offer to use in assigning SWAP leg prices;

3. Use a combination of Reuters Dealing Terminal Quotations for its strong currencies and CME GFX spot resources for the EBS strong currencies;

4. Use CME currency futures prices (bid and ask on CME Globex) for the nearby (most active) contract month and use Reuters forward points (or a combination of Reuters and Bloomberg forward points) to the IMM dates to strip out the synthetic spot bid and ask for pricing the CME SWAP leg prices. Simply average the bid and ask of these synthetic spot prices to assign the CME SWAP leg prices. This may be similar to CME trading floor operations' plans to use an analogous version of this technique to set CME FX futures settlement prices for the expiring months during the one-week rollover period by using the next deferred, more actively-traded CME FX futures contract prices and forward points to back out the expiring CME FX futures settlement price.) CME trading floor operations has a program that could possibly be modified to back out spot bid and asks from CME FX futures prices; or 5. Use the last price in the Spot market, through a certain age. If the last spot price was too old, this spot price would backstopped by the "daily settlement price" used to determine unrealized gains and losses (thus, never more than 24 hours old). However, number 4 above could work as an alternative for any time there is no spot, and if there are no futures bids and offers on CME Globex, then it could be backstopped by the last spot, and if no last spot price that day, could further be backstopped by the last daily settlement price.

It is therefore intended that the foregoing detailed description be regarded as illustrative rather than limiting, and that it be understood that it is the following claims, including all equivalents, that are intended to define the spirit and scope of this invention.

We claim:

1. A computer implemented method comprising:
receiving, via an electronic communications network by a processor of an electronic trading system from a first entity of a plurality of entities, a first request for a first transaction in a financial instrument;
receiving, via the electronic communications network by the processor from a second entity of the plurality of entities, a second request for a second transaction in the financial instrument, wherein the first and second requests are received within a threshold time of each other in an order different from an order in which they were transmitted due to network transmission latency of the electronic communications network;
determining, by the processor, that the first and second requests were received in an order different from an order in which they were transmitted;
forwarding, by the processor, the first and second requests to a matching processor coupled with the processor;
identifying, by the matching processor, a third request previously received via the electronic communications network by the electronic trading system from a third entity of the plurality of entities for a third transaction in the financial instrument where the third transaction is at least partially counter to the first and second transactions but insufficient to satisfy both the first and second transactions; and matching, by the matching processor, the prior transmitted of the first and second requests with the third request before matching any remainder of the third request with the later transmitted of the first and second requests and subsequently facilitating the transactions therebetween without the electronic trading system communicating data identifying the entities who transmitted the first or second requests and third entity to each other.

2. The computer implemented method of claim 1, further comprising:

initiating, by a clearing processor coupled with the matching processor, performance of the transaction of the prior transmitted request between the entity who transmitted the prior request and the electronic trading system and initiating performance of the third transaction between the third entity and the electronic trading system wherein if it is determined that one of the facilitated transactions is incapable of being completed, performance of the other of the facilitated transactions proceeds unaffected; and recording, by the clearing processor, in a first account stored in a database coupled with the electronic trading system and associated with the entity who transmitted the prior request, data indicative of a first position resulting from at least the initiation of the transaction of the prior transmitted request and indicating that the transaction of the prior transmitted request has yet to be completed, the first position being one of a plurality of positions for which data indicative thereof is recorded in the first account as a result of at least initiation of performance of a plurality of other transactions received from the entity who transmitted the prior request each of which has yet to be completed, wherein each of the plurality of other transactions is subject to subsequent completion between the electronic trading system and the entity who transmitted the prior request, each of the plurality of other transactions being associated with a counter-transaction matched with the other transaction by the electronic trading system.

3. The computer implemented method of claim 2, further comprising:

recognizing, by a netting processor coupled with the clearing processor, the first position of the plurality of positions in the first account at least partially correlates with a second position of the plurality of positions in the first account, the correlation being independent of them being recorded in the same account and independent of the counter-transaction associated with the at least one transaction from which the first and second positions resulted;

combining, by the netting processor, the recognized first position with the second position to create a net position and recording the net position in the first account, wherein at least one of the recognized first position, the second position or combinations thereof are nullified by the combining; and eliminating, by the netting processor, the recognized first position, the second position or combinations thereof, along with the associated transactions and data indicative thereof stored in the database, that are nullified by the combining;

whereby fewer positions, as well as the data indicative thereof, remain in the first account and database for subsequent completion of the associated transactions.

4. The computer implemented method of claim 2 wherein the clearing processor is separate from the electronic trading system.

5. The computer implemented method of claim 2, wherein the first account is characterized by a monetized risk value representative of the at least one position and a collateral value representative of the monetized risk value less any collateral value pledged as collateral, the method further comprising:

recording, in a second account associated with the entity who transmitted the prior request, at least one position resulting from at least one transaction related to one or more futures instruments;

computing a margin requirement for the second account based on the at least one position of the second account;

receiving a pledge of a portion of the collateral value of the first account to cover the margin requirement of the second account; and reducing the collateral value of the first account and the margin requirement of the second account based on the pledge.

6. The computer implemented method of claim 1, wherein the matching further comprises substituting the electronic trading system for the third entity in the transaction of the prior transmitted request and substituting the electronic trading system for the entity who transmitted the prior request in the third transaction.

7. The computer implemented method of claim 1, wherein the financial instrument comprises one of a forward, spot or swap instrument.

8. The computer implemented method of claim 1, wherein the third request was anonymized and routed, upon receipt, to all of the plurality of entities, the matching further comprising anonymizing and routing the prior transmitted request back only to the third entity.

9. The computer implemented method of claim 1, wherein the third request was anonymized and routed, upon receipt, to only a subset of the plurality of entities, the matching further comprising anonymizing and routing the prior transmitted request back only to the third entity.

10. The computer implemented method of claim 1, wherein the third request is characterized by a time period, within which a suitable counter transaction will be accepted, defined relative to a common reference.

11. The computer implemented method of claim 1, wherein evaluating further includes determining which of the first and second requests meet criteria specified by the third request.

12. A system comprising:

first non-transitory memory storing first computer executable program code executable by a first processor of an electronic device coupled therewith to cause the electronic device to perform a plurality of operations including:

receiving, via an electronic communications network coupled with the processor, a first request from a first entity of a plurality of entities for a first transaction in a financial instrument, and receive, via the electronic communications network, a second request from a second entity of the plurality of entities for a second transaction in the financial instrument, wherein the first and second requests are received within a threshold time of each other in an order different from an order in which they were transmitted due to network transmission latency of the electronic communications network; and determining that the first and second requests were received in an order different from an order in which they were transmitted and forward the first and second requests to a second processor of the electronic device coupled with the first processor; and a second non-transitory memory storing second computer executable program code executable by the second processor coupled therewith to cause the electronic device to perform a plurality of operations including:

identifying a third request previously received via the electronic communications network from a third entity of the plurality of entities for a third transaction in the financial instrument where the third transaction is at least partially counter to the first and second transactions but insufficient to satisfy both the first and second transactions; and matching the prior transmitted of the first and second requests with the third request before matching any remainder of the third request with the later transmitted of the first and second requests and subsequently facilitating the transactions therebetween without communication of data identifying the entities who transmitted the first or second requests and third entity to each other.

13. The system of claim 12, further comprising:

a third non-transitory memory storing third computer executable program code executable by a third processor of the electronic device coupled therewith to cause the electronic device to perform a plurality of operations including:

initiating performance of the transaction of the prior transmitted request between the entity who transmitted the prior request and the processor and initiate performance of the third transaction between the third entity and the third processor and further determining when one of the facilitated transactions is incapable of being completed and, upon that occurrence, completing performance of the other of the facilitated transactions proceeds unaffected; and recording, in a first account stored in a first account database coupled with the processor and associated with the entity who transmitted the prior request, data indicative of a first position resulting from at least the initiation of the transaction of the prior transmitted request and indicating that the transaction of the prior transmitted request has yet to be completed, the first position being one of a plurality of positions for which data indicative thereof is recorded in the first account as a result of at least initiation of performance of a plurality of other transactions received from the entity who transmitted the prior request each of which has yet to be completed, wherein each of the plurality of other transactions is subject to subsequent completion between the processor and the entity who transmitted the prior request, each of the plurality of other transactions being associated with a counter-transaction matched with the other transaction by the processor.

14. The system of claim 13, further comprising:

a fourth non-transitory memory storing fourth computer executable program code executable by a fourth processor of the electronic device coupled therewith to cause the electronic device to perform a plurality of operations including:

recognizing the first position of the plurality of positions in the first account at least partially correlates with a second position of the plurality of positions in the first account, the correlation being independent of them being recorded in the same account and independent of the counter-transaction associated with the at least one transaction from which the first and second positions resulted; and combining the recognized first position with the second position to create a net position and record the net position in the first account and eliminate the recognized first position, the second position or combinations thereof, along with the associated transactions and data indicative thereof stored in the first account database, that are nullified by the combination;

whereby fewer positions, as well as the data indicative thereof, remain in the first account and first account database for subsequent completion of the associated transactions.

15. The system of claim 13, wherein the third processor is separate from the first and second processors.

16. The system of claim 13, wherein the first account is characterized by a monetized risk value representative of the at least one position and a collateral value representative of the monetized risk value less any collateral value pledged as collateral, the third computer executable program code being further executable by the third processor to cause the electronic device to perform a plurality of operations including:

recording, in a second account of a second account database associated with the entity who transmitted the prior request, at least one position resulting from at least one transaction related to one or more futures instruments;

computing a margin requirement for the second account based on the at least one position of the second account;

receiving a pledge of a portion of the collateral value of the first account to cover the margin requirement of the second account; and reducing the collateral value of the first account and the margin requirement of the second account based on the pledge.

17. The system of claim 12, wherein the first computer executable program code is further executable by the first processor to cause the electronic device to perform a plurality of operations including:

collateralizing a monetized risk value of the completed transaction and allowing the entity, from which the completed transaction request was received, to pledge at least a portion thereof against a margin requirement.

18. The system of claim 12, wherein the first computer executable program code is further executable by the first processor to cause the electronic device to perform a plurality of operations including substituting the first processor for the third entity in the transaction of the prior transmitted request and substituting the processor for the entity who transmitted the prior request in the third transaction.

19. The system of claim 12, wherein the financial instrument comprises one of a forward, spot or swap instrument.

20. The system of claim 12, wherein the third request was anonymized and routed, upon receipt, to all of the plurality of entities, the first computer executable program code being further executable by the first processor to cause the electronic device to perform a plurality of operations including anonymizing and routing the prior transmitted request back only to the third entity.

21. The system of claim 12, wherein the third request was anonymized and routed, upon receipt, to only a subset of the plurality of entities, the first computer executable program code being further executable by the first processor to cause the electronic device to perform a plurality of operations including anonymizing and routing the prior transmitted request back only to the third entity.

22. The system of claim 12, wherein the third request is characterized by a time period, within which a suitable counter transaction will be accepted, defined relative to a common reference.

23. The system of claim 12, wherein the first computer executable program code is further executable by the first processor to cause the electronic device to perform a plurality of operations including selecting which of the first and second requests meet criteria specified by the third request.

24. A system comprising:
a first processor and a first non-transitory memory coupled therewith, the first non-transitory memory storing computer executable instructions which, when executed by the first processor, cause the first processor to:
receive, via an electronic communications network coupled with the processor, a first request from a first entity of a plurality of entities for a first transaction in a financial instrument, and receive, via the electronic communications network, a second request from a second entity of the plurality of entities for a second transaction in the financial instrument, wherein the first and second requests are received within a threshold time of each other in an order different from an order in which they were transmitted due to network transmission latency of the electronic communications network; and
determine that the first and second requests were received in an order different from an order in which they were transmitted and forward the first and second requests to a second processor coupled with the first processor; and
a second processor coupled with the first processor and a second non-transitory memory, the second non-transitory memory storing computer executable instructions which, when executed by the second processor, cause the second processor to:
identify a third request previously received via the electronic communications network by the processor from a third entity of the plurality of entities for a third transaction in the financial instrument where the third transaction is at least partially counter to the first and second transactions but insufficient to satisfy both the first and second transactions; and
match the prior transmitted of the first and second requests with the third request before matching any remainder of the third request with the later transmitted of the first and second requests and subsequently facilitate the transactions therebetween without communication of data identifying the entities who transmitted the first and second requests and third entity to each other.

25. The system of claim 24, further comprising:
a third processor coupled with the second processor and a third non-transitory memory, the third non-transitory memory storing computer executable instructions which, when executed by the third processor, cause the third processor to:
initiate performance of the transaction of the prior transmitted request between the entity who transmitted the prior request and the processor and initiate performance of the third transaction between the third entity and the processor wherein the settlement processor is operative to determine when one of the facilitated transactions is incapable of being completed and, upon that occurrence, operative to complete performance of the other of the facilitated transactions proceeds unaffected; and
record, in an account stored in a database coupled with the processor and associated with the entity who transmitted the prior request, data indicative of a first position resulting from at least the initiation of the transaction of the prior transmitted request and indicating that the transaction of the prior transmitted request has yet to be completed, the first position being one of a plurality of positions for which data indicative thereof is recorded in the account as a result of at least initiation of performance of a plurality of other transactions received from the entity who transmitted the prior request each of which has yet to be completed, wherein each of the plurality of other transactions is subject to subsequent completion between the processor and the entity who transmitted the prior request, each of the plurality of other transactions being associated with a counter-transaction matched with the other transaction by the processor.

26. The system of claim 25, further comprising:
a fourth processor coupled with the third processor and a fourth non-transitory memory, the fourth non-transitory memory storing computer executable instructions which, when executed by the fourth processor, cause the fourth processor to:
recognize the first position of the plurality of positions in the account at least partially correlates with a second position of the plurality of positions in the account, the correlation being independent of them being recorded in the same account and independent of the counter-transaction associated with the at least one transaction from which the first and second positions resulted; and
combine the recognized first position with the second position to create a net position and record the net position in the account and eliminate the recognized first position, the second position or combinations thereof, along with the associated transactions and data indicative thereof stored in the database, that are nullified by the combination; and
whereby fewer positions, as well as the data indicative thereof, remain in the first account and the database for subsequent completion of the associated transactions.

* * * * *